(12) United States Patent
Sameshima et al.

(10) Patent No.: US 8,313,252 B2
(45) Date of Patent: Nov. 20, 2012

(54) FILM LIGHT GUIDE PACKAGE, FILM LIGHT GUIDE MODULE, AND ELECTRONIC DEVICE

(75) Inventors: Hiroshi Sameshima, Nara (JP); Naru Yasuda, Uji (JP); Hayami Hosokawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 335 days.

(21) Appl. No.: 12/671,345

(22) PCT Filed: Aug. 6, 2008

(86) PCT No.: PCT/JP2008/064162
§ 371 (c)(1),
(2), (4) Date: Jan. 29, 2010

(87) PCT Pub. No.: WO2009/020165
PCT Pub. Date: Feb. 12, 2009

(65) Prior Publication Data
US 2010/0202732 A1    Aug. 12, 2010

(30) Foreign Application Priority Data
Aug. 7, 2007  (JP) ................................ 2007-205895

(51) Int. Cl.
*G02B 6/36* (2006.01)
(52) U.S. Cl. .......................................... 385/94; 385/92
(58) Field of Classification Search .................... 385/14, 385/88, 92, 94
See application file for complete search history.

(56) References Cited

U.S. PATENT DOCUMENTS 5,499,312 A * 3/1996 Hahn et al. ...................... 385/91
6,821,027 B2 * 11/2004 Lee et al. ........................ 385/89
(Continued)

FOREIGN PATENT DOCUMENTS

JP          11-168147 A       6/1999
(Continued)

OTHER PUBLICATIONS

International Search Report issued in PCT/JP2008/064162, mailed on Oct. 7, 2008, with translation, 4 pages.
(Continued)

*Primary Examiner* — Daniel Petkovsek
(74) *Attorney, Agent, or Firm* — Osha Liang LLP

(57) ABSTRACT

In a package (5) formed by a supporting portion (5a) for supporting a light emitting portion (7) or a light receiving portion (9) for emitting or receiving an optical signal, and a lid (5b) for covering the supporting portion (5a); the supporting portion (5a) or the lid (5b) includes a light guide mounting surface (22) for supporting at least one end including an incident/exit port of the optical signal in a film light guide (4) for optically coupling with the light emitting portion (7) or the light receiving portion (9) and transmitting the optical signal; and a length (D) in a Z-direction serving as a perpendicular direction with respect to the light guide mounting surface (22) from the light guide mounting surface (22) of the supporting portion (5a) or the lid (5b) to the lid (5b) or the supporting portion (5a) facing the light guide mounting surface (22) is longer than a length (d) in the Z-direction in a region of the film light guide (4) supported by the light guide mounting surface (22). The light guide package having a structure in which the deformation and the damage of the core are less likely to occur even when subjected to impact by vibration and the like is thereby provided.

14 Claims, 25 Drawing Sheets

U.S. PATENT DOCUMENTS

| | | | |
|---|---|---|---|
| 6,848,839 B2 * | 2/2005 | Steinberg | 385/88 |
| 6,932,519 B2 * | 8/2005 | Steinberg et al. | 385/92 |
| 7,254,301 B2 * | 8/2007 | Hoshino et al. | 385/52 |
| 7,907,802 B2 * | 3/2011 | Sano et al. | 385/14 |
| 8,052,337 B2 * | 11/2011 | Sameshima et al. | 385/94 |

FOREIGN PATENT DOCUMENTS

| | | |
|---|---|---|
| JP | 2000-019360 A | 1/2000 |
| JP | 2003-107296 A | 4/2003 |
| JP | 2003-315632 A | 11/2003 |
| JP | 2006-039255 A | 2/2006 |
| WO | 2007/074911 A1 | 7/2007 |

OTHER PUBLICATIONS

Written Opinion issued in PCT/JP2008/064162, mailed on Oct. 7, 2008, 3 pages.

* cited by examiner (a)

(b)

D−d=h1

(a)

(b)

(a)

(c)

(b)

(a)

(b)

(c)

(d)

FILM LIGHT GUIDE PACKAGE, FILM LIGHT GUIDE MODULE, AND ELECTRONIC DEVICE

TECHNICAL FIELD

The present invention relates to optical communication cable modules, and in particular, to a package in an optical cable.

BACKGROUND ART

In recent years, an optical communication network enabling large capacity data communication at high speed is expanding. The optical communication network is assumed to be mounted from intra-devices to inter-device in the future. A light guide that can be arrayed is expected to realize the print wiring substrate as an optical wiring.

The light guide is formed by a core having a large index of refraction and a clad having a small index of refraction arranged in contact with a periphery of the core, and propagates an optical signal entered to the core while repeating total reflection at the boundary of the core and the clad.

In the midst of such circumstances, particularly in recent years, a flexible (similar to electrical wiring) optical wiring mounted on a bendable display and a more compact and thin commercial-off-the-shelf device is desired to be realized with a light guide. That is, the light guide is desirably a film-shaped light guide.

The photoelectric conversion elements (light emitting and receiving elements) need to be aligned and optically coupled to transmit the optical data using the light guide. The light emitting and receiving elements convert an electrical signal to an optical signal and emit the same, and receive the optical signal and convert the same to the electrical signal. In order to hold the optically coupled state, the light guide needs to be fixed, and the distance between the light emitting and receiving unit of the optical signal in the light emitting and receiving element and an incident/exit port of the optical signal in the light guide and the positional relationship of the same need to be maintained constant.

A method of fixing the light guide includes a method of fixing the light guide with a package as shown in Patent Document 1.

FIG. 29 is a perspective view showing a schematic configuration of a package 105 of an optical module 100 described in Patent Document 1. As shown in FIG. 29, the optical module 100 has a configuration including a light guide 101, an optical element 102, and the package 105 made up of a mounting substrate 103 and a supporting body 104. Specifically, the package 105 is formed by integrating the mounting substrate 103 and the supporting body 104 by adhering the contacting surface of the supporting body 104 adhered with the upper surface of the light guide 101 and the contacting surface of the mounting substrate 103 mounted with the optical element 102 with the direction of the optical element 102 with respect to the light guide 101 as the downward direction. In this case, a light guide supporting surface 106 of the mounting substrate 103 adheres with the light guide 101, and thus the light guide 101 is also supported by the mounting substrate 103. In other words, the light guide 101 is supported so as to be sandwiched from both sides by the supporting body 104 and the mounting substrate 103.

According to the configuration of adhering the contacting surface of the supporting body 104 and the contacting surface of the mounting substrate 103 for supporting the light guide 101, the positional relationship of the light guide 101 and the optical element 102, and the distance between the incident/exit port of the optical signal in the light guide 101 and the optical element 102 can be maintained constant.

Patent document 1: Japanese Unexamined Patent Publication No. 2006-39255 (date of publication: Feb. 9, 2006)

DISCLOSURE OF THE INVENTION

The optical module is expected to be mounted on the small electronic device such as a portable telephone that is used daily, but the performance of the light transmission is desirably not lowered by impact such as vibration.

However, in the package 105 in the background art, the light guide 101 is adhered and held so as to be sandwiched in the up and down direction by the supporting body 104 and the mounting substrate 103. Thus, the core may deform or may be crushed when the optical module 100 vibrates in the up and down direction and stress applies on the core of the light guide 101 due to the impact of vibration. As a result, drawbacks may occur in the light transmission inside the core, and the optical characteristics may be affected.

One or more embodiments of the present invention provide a light guide package having a structure in which the deformation and the damage of the core are less likely to occur even when subjected to impact by vibration and the like.

In one or more embodiments of the present invention, a film light guide package of the present invention is formed by a supporting portion for supporting an optical element for emitting or receiving an optical signal, and a lid for covering the supporting portion; wherein the supporting portion or the lid includes a supporting surface for supporting at least one end including an incident/exit port of the optical signal in a film light guide for optically coupling with the optical element and transmitting the optical signal; and a length in a first direction serving as a perpendicular direction with respect to the supporting surface from the supporting surface of the supporting portion or the lid to the lid or the supporting portion facing the supporting surface is longer than a length in the first direction in a region of the film light guide supported by the supporting surface.

According to the above configuration, a gap is formed between the upper surface of the film light guide and the lid or between the lower surface of the film light guide and the supporting surface in a region where the film light guide is supported. Thus, when the film light guide package is pressurized or vibrated in the up and down direction, the pressure applied to the film light guide can be reduced. Therefore, stable light transmission by the film light guide can be performed since deformation and damage of the core due to vibration, impact, and the like can be prevented.

In the film light guide package according to the present invention, an adhesive having higher flexibility than the film light guide is filled in a region of at least one part of a spatial region formed between the film light guide and the supporting portion or the lid facing the supporting surface.

For example, if the adhesive has lower flexibility than the film light guide, that is, it is made of a raw material harder than the film light guide, the force from the lid or the supporting portion cannot be absorbed when the lid or the supporting portion deforms by expansion from temperature change or vibration impact from the outside, whereby the film light guide is subjected to force from the adhesive and the supporting surface, and the deformation and the damage of the core occur.

However, according to the above configuration, the adhesive has higher flexibility than the film light guide in the film light guide package of the present invention, and thus the force applied to the film light guide due to the deformation of the lid or the supporting portion from temperature change, vibration impact, and the like can be absorbed.

In other words, the adhesive plays a role of a cushion. Therefore, the deformation and the damage of the core when the film light guide package is subjected to vibration impact and the like can be prevented.

Preferably, in the film light guide package according to the present invention, the supporting portion and the lid are fixed by a lid adhesive, and the film light guide and the film light guide package are fixed by at least one of a first adhesive arranged between the lid and the film light guide or a second adhesive arranged between the film light guide and the supporting portion in the first direction; and at least one of either the first adhesive or the second adhesive has the length in the first direction longer than the length in the first direction of the lid adhesive and has higher flexibility than the film light guide.

For example, if the first adhesive and the second adhesive have lower flexibility than the film light guide, that is, they are made of a raw material harder than the film light guide, the force from the lid or the supporting portion cannot be absorbed when the lid or the supporting portion deforms by expansion from temperature change or vibration impact from the outside, whereby the film light guide is subjected to force from the first adhesive and the second adhesive, and the supporting surface, and the deformation and the damage of the core occur.

However, according to the above configuration, at least one of either the first adhesive or the second adhesive has higher flexibility than the film light guide in the film light guide package of the present invention, and thus the force applied to the film light guide due to the deformation of the lid or the supporting portion from temperature change, vibration impact, and the like can be absorbed. In other words, at least one of either the first adhesive or the second adhesive plays a role of a cushion. Therefore, the deformation and the damage of the core when the film light guide package is subjected to vibration impact and the like can be prevented.

In the film light guide package of the present invention, at least one of either the first adhesive or the second adhesive has longer length in the first direction than the length in the first direction of the lid adhesive and has higher flexibility than the film light guide. Thus, the thickness of the adhesive functioning as a cushion for fixing the film light guide can be sufficiently ensured. Therefore, even if the film light guide package is subjected to a large external force from the outside, the external force can be absorbed by at least one of either the first adhesive or the second adhesive, and the deformation and the damage of the core due to vibration impact and the like from the outside can be prevented. As a result, stable light transmission by the film light guide can be carried out.

In the film light guide package according to the present invention, the length in the first direction of at least one of either the first adhesive or the second adhesive is preferably greater than or equal to 5 µm.

According to the above configuration, the thickness in the first direction of at least one of either the first adhesive or the second adhesive becomes large, and thus influence of the deformation of the lid or the supporting portion caused by vibration impact and temperature change on the film light guide can be further reduced. The deformation and the damage of the core thus can be prevented even when the vibration impact and the temperature change are large.

Preferably, in the film light guide package according to the present invention, at least one side wall of the film light guide package formed by the supporting portion and the lid includes at least one through-hole for accommodating the end of the film light guide at an interior of the film light guide package; and all regions other than the region where the film light guide passes through in the through-hole are filled with at least one of either the first adhesive or the second adhesive.

According to the above configuration, all regions other than the region where the film light guide passes through in the through-hole are filled with at least one of the first adhesive or the second adhesive softer than the film light guide, and thus the influence of the vibration impact in the first direction at the opening on the film light guide can also be reduced. Since the deformation and the damage of the core due to vibration impact and the like from the package side surface thus can also be prevented, a more stable light transmission by the film light guide can be carried out. The dust, powder dust, and moisture are prevented from entering from the exterior of the package to the interior of the package since the spatial region in the through-hole is sealed with the adhesive.

In the film light guide package according to the present invention, a Young's modulus of at least one of either the first adhesive or the second adhesive is preferably smaller than a Young's modulus of the film light guide.

According to the above configuration, the Young's modulus of at least one of either the first adhesive or the second adhesive is smaller than the Young's modulus of the film light guide, and thus the force applied by the deformation of the lid or the supporting portion due to temperature change, vibration impact and the like can be absorbed.

Therefore, the deformation and the damage of the core due to impact such as vibration can be prevented, and a stable light transmission in the film light guide can be carried out.

In the film light guide package according to the present invention, at least one of either the first adhesive or the second adhesive is preferably made of resin material.

According to the above configuration, since the resin material has flexible characteristics, at least one of either the first adhesive or the second adhesive can flexibly deform accordingly even if the lid or the supporting portion of the package deforms due to vibration impact or expansion by temperature change. Thus, the force received by the deformation of the lid or the supporting portion can be absorbed, and the deformation and the damage of the core by impact such as vibration can be prevented. As a result, a stable light transmission by the film light guide can be carried out.

A film light guide module of the present invention includes: an optical element for emitting or receiving an optical signal; a film light guide, including a core made of a material having translucency and a clad made of a material having an index of refraction different from an index of refraction of the core, for optically coupling with the optical element and transmitting the optical signal; and the film light guide package described above for accommodating the optical element and at least one end including an incident/exit port of the optical signal in the film light guide.

According to the above configuration, the film light guide module includes a package having a structure in which the deformation and the damage of the core are less likely to occur even when subjected to impact such as vibration, and thus a film light guide module enabling stable light transmission even when subjected to impact such as vibration can be realized.

The film light guide module can be applied to an electronic device.

The film light guide package of the present invention has a configuration in which the length in the first direction serving as the perpendicular direction with respect to the supporting surface from the supporting surface of the supporting portion or the lid to the lid or the supporting portion facing the supporting surface is longer than the length in the first direction in the region of the film light guide supported by the supporting surface.

Thus, an effect in that a light guide package having a structure in which the deformation and the damage of the core are less likely to occur even when subjected to impact such as vibration can be provided is obtained.

Figure 1A:
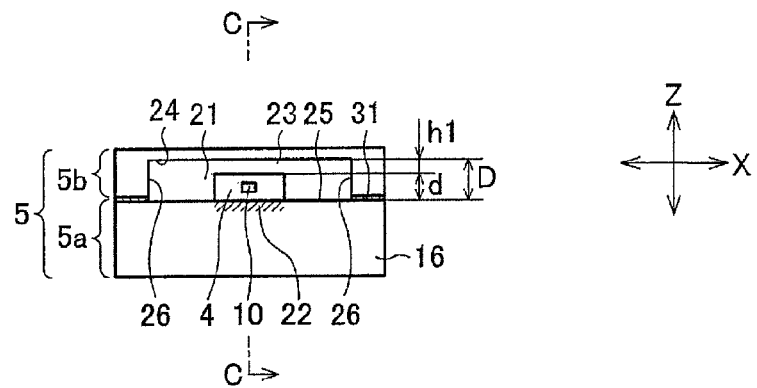
FIG. 1(a) is a view showing a schematic configuration of a light guide module according to the present embodiment, and is a longitudinal cross-sectional view of the light guide module in a state where a light guide is mounted on a package when seen from a light receiving portion side (view taken along line A-A of FIG. 1(b)).

DESCRIPTION OF SYMBOLS 1 light guide module (film light guide module)
4 light guide (film light guide)
4A light incident surface
5 package (film light guide package)
5a supporting portion
5b lid
6 light emitting drive portion
7 light emitting portion (optical element)
8 light receiving driving portion
9 light receiving portion (optical element)
10 core
11 clad
12 electrical wiring
13 lead frame substrate
14 recess
15, 16, 18 side wall
20 opening
21 through-hole
22 light guide mounting surface (supporting surface)
23 gap (spatial region)
24 through-hole upper surface
25 through-hole lower surface
26 through-hole side surface
30 adhesive (second adhesive)
31 adhesive (lid adhesive)
32 adhesive (first adhesive)
33 height compensation member
34 projection (supporting portion)

BEST MODE FOR CARRYING OUT THE INVENTION

One embodiment of the present invention will be described below with reference to the drawings.

(Configuration of Light Guide Module)

Figure 3:
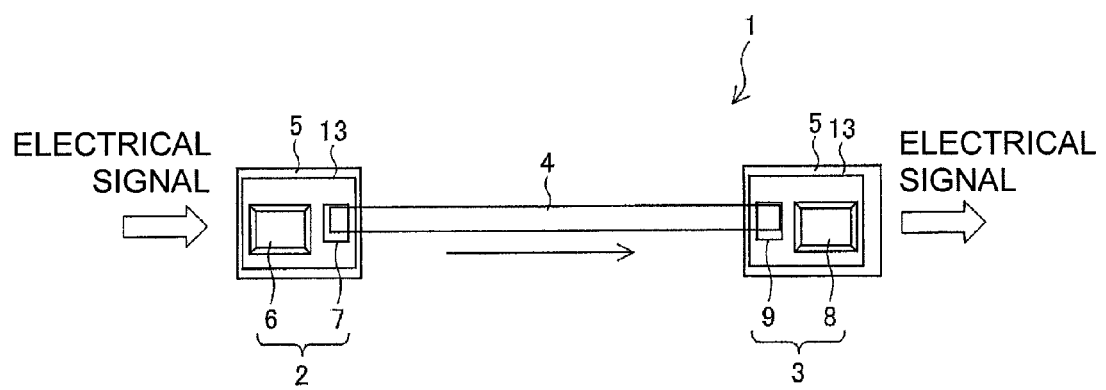
FIG. 3 is a block diagram showing a schematic configuration of the light guide module according to the present embodiment.

FIG. 3 shows a schematic configuration of a light guide module 1 according to the present embodiment. As shown in the figure, the light guide module 1 includes a light transmission processing unit 2, a light reception processing unit 3, a light guide (film light guide) 4, and a package (film light guide package) 5.

The light transmission processing unit 2 includes a light emitting drive portion 6 and a light emitting portion (optical element) 7, and is mounted on a lead frame substrate 13 through methods such as soldering.

The light emitting drive portion 6 drives the light emission of the light emitting portion 7 based on an electrical signal inputted from the outside. The light emitting drive portion 6 is configured by a light emission drive IC (Integrated Circuit). Although not shown, the light emitting drive portion 6 includes an electrical connecting part with respect to an electrical wiring for transmitting the electrical signal from the outside. In FIG. 3, the light emitting drive portion 6 is arranged inside the package 5, but the present invention is not limited thereto, and may be arranged at the exterior of the package 5.

The light emitting portion 7 emits light based on a drive control by the light emitting drive portion 6. The light emitting portion 7 is configured by a light emitting element such as VCSEL (Vertical Cavity-Surface Emitting Laser). A light incident side end of the light guide 4 is irradiated with the light emitted from the light emitting portion 7 as a light signal.

The light reception processing unit 3 includes an amplifier 8 and a light receiving portion (optical element) 9, and is mounted on the lead frame substrate 13 through a method such as soldering. The light receiving portion 9 receives the light serving as the optical signal emitted from a light exit side end of the light guide 4, and outputs an electrical signal by photoelectric conversion. The light emitting portion 9 is configured by a light receiving element such as PD (Photo-Diode).

The amplifier 8 amplifies the electric signal outputted from the light receiving portion 9 and outputs the same to the outside. The amplifier 8 is configured by amplification IC, for example. Although not shown, the amplifier 8 includes an electrical connecting part with respect to the electrical wiring for transmitting the electrical signal to the outside.

The light guide 4 is a medium for transmitting the light exit from the light emitting portion 7 to the light receiving portion 9, and the package 5 is provided to mount the light transmission processing unit 2 or the light reception processing unit 3 and at least one end including an incident/exit port of the optical signal in the light guide 4. The detailed configuration of the light guide 4 and the package 5 will be described later.

Figure 1B:
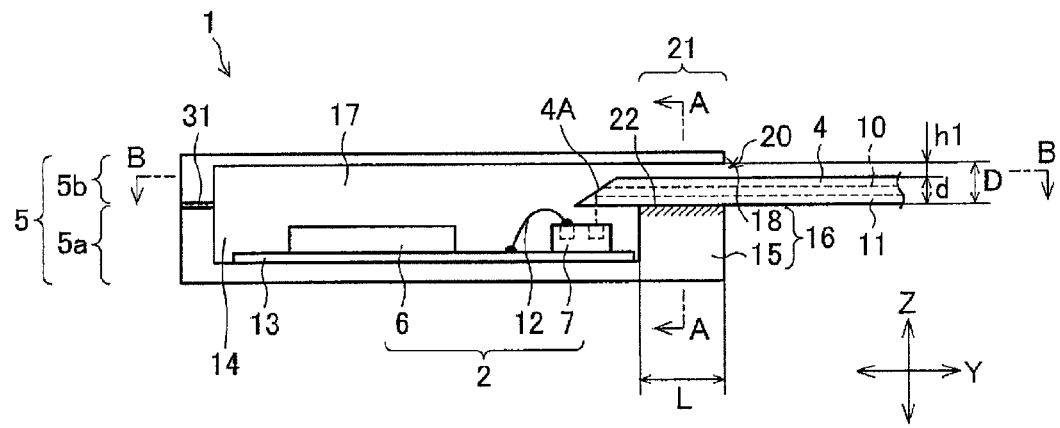
FIG. 1(b) is a view showing a schematic configuration of a light guide module according to the present embodiment, and is a transverse cross-sectional view of the light guide module in a state where a light guide is mounted on a package when seen from a light receiving portion side (view taken along line C-C of FIG. 1(a)).
Figure 1C:
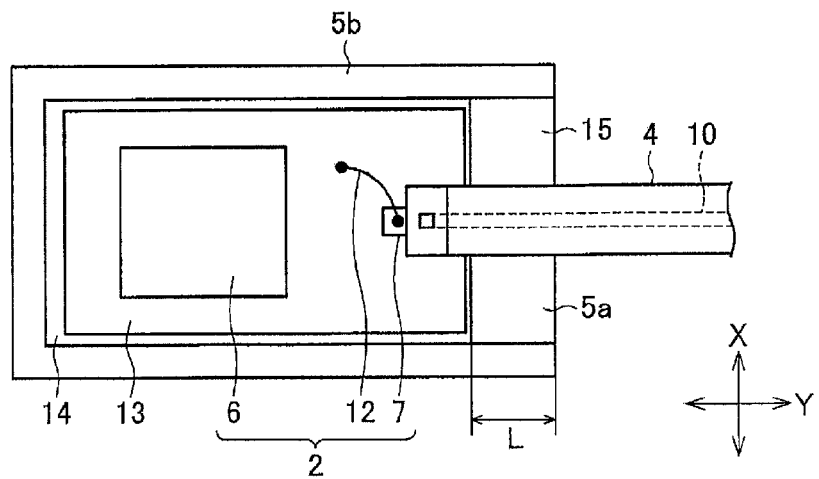
FIG. 1(c) is a view showing a schematic configuration of a light guide module according to the present embodiment, and is a top view of the light guide module in a state where a light guide is mounted on a package when seen from a light receiving portion side (view taken along line B-B of FIG. 1(b)).

The electrical wiring 12 (see FIGS. 1(a) to 1(c)) mounted on the package 5 connects the light emitting drive portion 6 and the light emitting portion 7 through the lead frame substrate 13, and transmits the electrical signal serving as a drive signal. In the light reception processing unit 3 as well, the amplifier 8 and the light receiving portion 9 are connected by the electrical wiring 12 through the lead frame substrate 13. In the present embodiment, the light emitting drive portion 6 and the light emitting portion 7, and the amplifier 8 and the light receiving portion 9 are electrically connected through the lead frame substrate 13, but a flexible print substrate (FPC), a coaxial cable and the like may be used.

(Configuration of Light Guide)

The configuration of the light guide 4 will be described in detail below.

Figure 4:
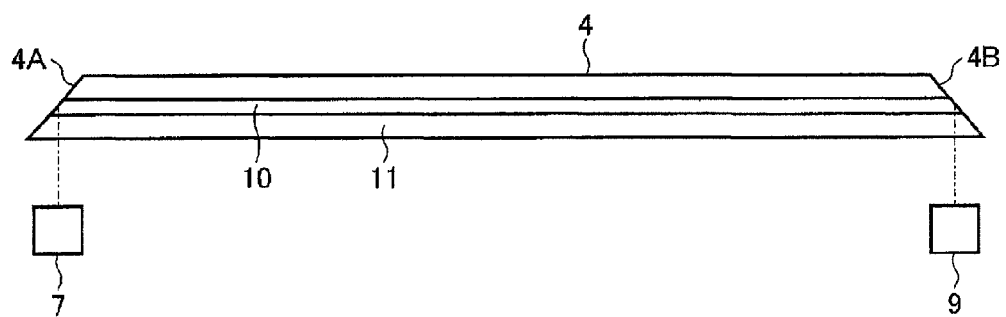
FIGS. 4(a) and 4(b) are a side view showing a schematic configuration of the light guide according to the present embodiment, and a view schematically showing a state of light transmission in the light guide, respectively.
Figure 4:
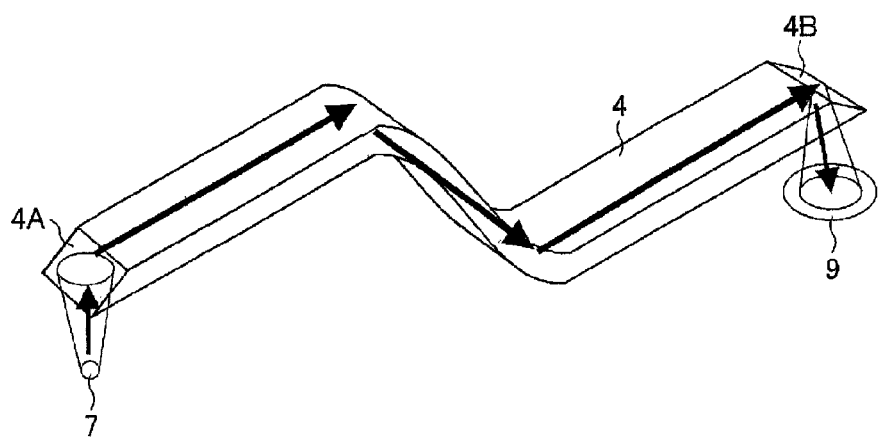

FIG. 4(a) is a side view showing a schematic configuration of the light guide 4, and FIG. 4(b) is a view schematically showing the state of light transmission in the light guide 4.

The light guide 4 is configured by a columnar-shaped member having flexibility. Specifically, as shown in FIG. 4(a), the light guide 4 has a configuration including a columnar-shaped core 10 having the light transmission direction as the axis, and a clad 11 arranged to surround the periphery of the core 10. The core 10 and the clad 11 are made of a material having translucency, and the index of refraction of the core 10 is higher than the index of refraction of the clad 11. Thus, the optical signal that entered the core 10 is transmitted in the light transmission direction by repeating total reflection inside the core 10.

The material for forming the core 10 and the clad 11 may be glass, plastic, and the like, but resin material of acryl, epoxy, urethane, silicon, and the like is preferably used to configure the light guide 4 having sufficient flexibility. The clad 11 may be made of gas such as air. Furthermore, similar effects can be obtained even if the clad 11 is used under an atmosphere of liquid having a smaller index of refraction than the core 10. The cross-sectional shape of the core 10 at the plane perpendicular to the light transmission direction is a rectangle.

As shown in FIG. 4(b), a light incident surface 4A is arranged at the light incident side end of the light guide 4, and a light exit surface 4B is arranged at the light exit side end. The light incident surface 4A and the light exit surface 4B are arranged diagonally with respect to the light transmission direction when the light is transmitted through the core 10.

The light exit from the light emitting portion 7 enters the light incident side end of the light guide 4 from the direction perpendicular to the light transmission direction (second direction) of the light guide 4. The incident light is advanced through the light guide 4 by being reflected at the light incident surface 4A. The light advanced through the light guide 4 and reached the light exit side end is reflected by the light exit surface 4B to be exit in the direction perpendicular to the light transmission direction of the light guide 4. The exit light is applied to the light receiving portion 9, and subjected to photoelectric conversion in the light receiving portion 9.

(Configuration of Package)

The configuration of the package 5 will now be described.

FIG. 1(b) is a transverse cross-sectional view showing a schematic configuration of the light guide module 1 in a state where the light guide 4 is mounted on the package 5. FIG. 1(a) is a longitudinal cross-sectional view showing a schematic configuration of the light guide module 1 when the light guide module 1, in a state where the light guide 4 is mounted on the package 5, is seen from the light receiving portion 9 (FIG. 3) side, that is, a view taken along the line A-A of FIG. 1(b). FIG. 1(c) is a top view showing a schematic configuration of the light guide module 1 in a state where the light guide 4 is mounted on the package 5, that is, a view taken along the line B-B of FIG. 1(b).

Figure 5:
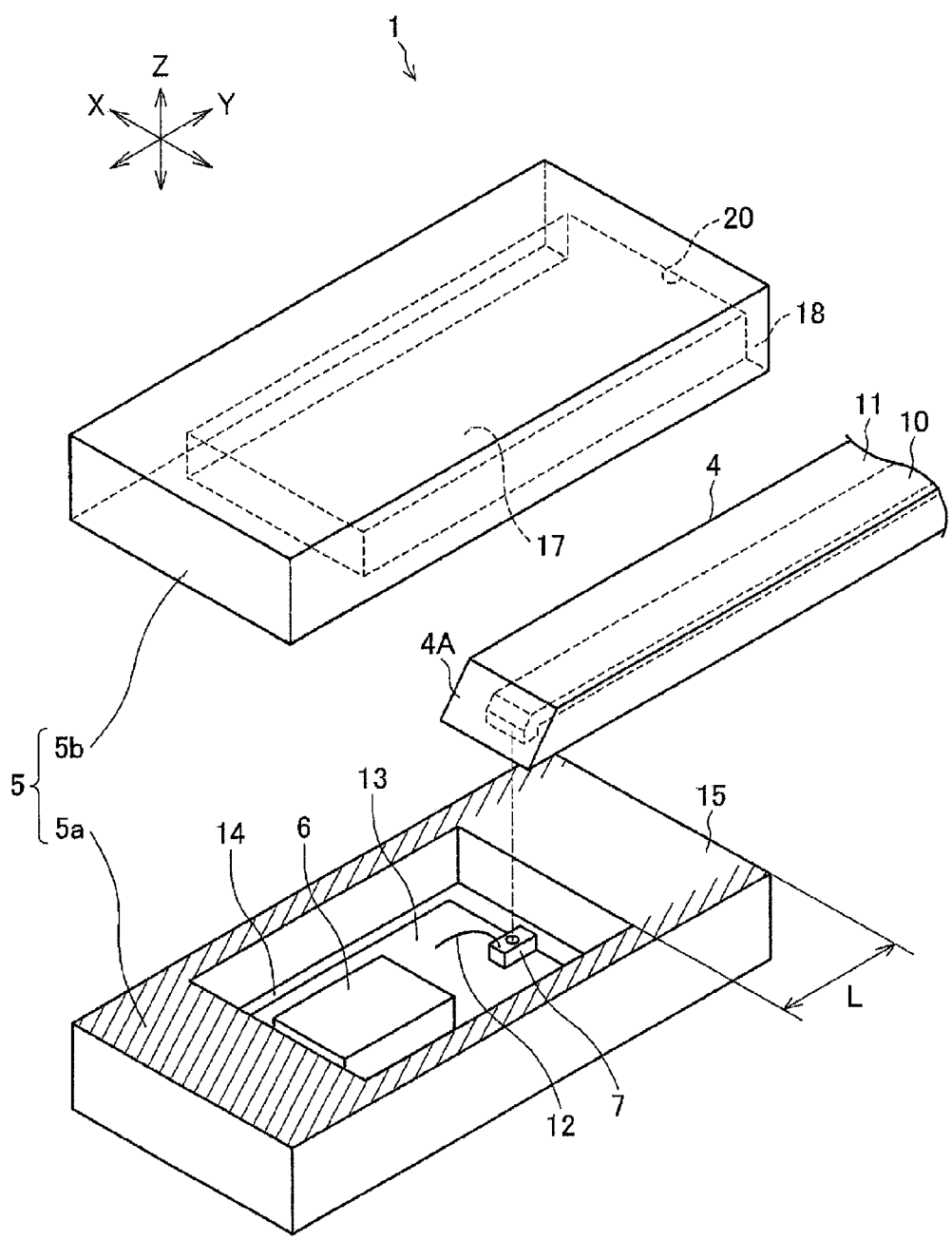
FIG. 5 is a perspective view showing a schematic configuration of the light guide module including a package according to the present embodiment.

FIG. 5 is a perspective view showing a schematic configuration of the package 5 in the light guide module 1 of the present embodiment.

An extending direction of the light guide 4 mounted on the package 5 is a Y-axis direction, a normal direction with respect to the light emitting surface of the light emitting portion 7 is a Z-axis direction (first direction), and a direction perpendicular to a Z-Y plane, that is, a transverse (longitudinal) direction at the end face of the light guide 4 is an X-axis direction. The direction of the light guide 4 with respect to the light emitting portion 7 is the upward direction, and the opposite direction, that is, the direction of the light emitting portion 7 with respect to the light guide 4, is the downward direction. The package for mounting the light reception processing unit 3 has the same configuration as the package for mounting the light transmission processing unit 2, and thus the description on the package in the light reception processing unit 3 will be omitted for the sake of convenience of description.

As shown in FIGS. 1(a) and (b), the package 5 includes a supporting portion 5a and a lid 5b, and is formed by adhering the lower surface of the lid 5b to the upper surface of the supporting portion 5a with an adhesive (lid adhesive) 31 so as to integrate the same.

The supporting portion 5a interiorly includes the light transmission processing unit 2, and supports the light guide 4 mounted on the upper surface of the supporting portion 5a. As shown in FIG. 5, the supporting portion 5a has an outer shape of a rectangular solid shape extending in the Y-axis direction, and is interiorly formed with a recess 14 having four sides surrounded to a rectangular shape by side walls raised from a bottom plate. As shown in FIG. 1(c), the lead frame substrate 13 including the light emitting drive portion 6 and the light emitting portion 7 is mounted on the bottom plate of the recess 14.

The supporting portion 5a includes a light guide mounting surface (supporting surface) 22 for mounting the light guide 4 at the upper surface of the side wall 15 formed on the light emitting portion 7 side in the Y-axis direction of the side walls forming the recess 14.

The portion that adheres with the lid 5b at the upper surface of the four side walls forming the recess 14, specifically, both ends in the X-axis direction at the upper surface of the side wall 15, the upper surface of the side walls facing each other that extend in the Y-axis direction, and the upper surface of the side wall formed on the light emitting drive portion 6 side in the Y-axis direction are the lid mounting surface (shaded region in FIG. 5).

The lid 5b covers the ends of the supporting portion 5a and the light guide 4 so that powder dust and dirt do not enter between the light emitting portion 7 mounted in the recess 14 of the supporting portion 5a and the light guide 4.

As shown in FIG. 5, the lid 5b is integrated with the supporting portion 5a to form a mainly rectangular solid shaped package 5, so that the size of each side in the X-Y plane of the outer frame of the lid 5b and the size of each side in the X-Y plane of the outer frame of the supporting portion 5a are the same. In other words, the outer shape of the lid 5b has a rectangular solid shape extending in the Y-axis direction, similar to the supporting portion 5a. The specific shape of the lid 5b will be described below.

The lid 5b has a shape in which the interior is bored to form a space for covering the light guide 4 projecting to the upper side by the thickness of itself with respect to the upper surface by mounting the light guide 4 on the upper surface of the supporting portion 5a.

Specifically, as shown in FIG. 5, the lower surface of the lid 5b is formed with a recess 17 by four side walls extending downward from the upper plate of the lid 5b. Among the four side walls, an opening 20 is formed at a side wall 18 facing the side wall 15 when the lid 5b is mounted on the supporting portion 5a so that the light guide 4 can be accommodated in the recess 17.

The configuration in which the lid 5b and the light guide 4 are mounted on the supporting portion 5a will be described below with reference to FIGS. 1(a) to 1(c), and FIGS. 2(a) to 2(c).

The light guide module 1 shown in FIGS. 1(a) to 1(c) has a configuration in which a length D in the Z-axis direction (first direction), which is the perpendicular direction with respect to the light guide mounting surface (supporting surface) 22, from the light guide mounting surface 22 for supporting the light guide 4 at the supporting portion 5a to the lid 5b facing the light guide mounting surface 22 is longer than a length d in the Z-axis direction in the region of the light guide 4 supported by the supporting portion 5a.

A method of fixing the light guide 4 to the supporting portion 5a is not particularly limited, and may be a method of sandwiching the side surface (X-axis direction) of the light guide 4 or a method of fixing the light guide 4 at the interior of the package 5. In other words, in the configuration of FIGS. 1(a) to 1(c), the light guide 4 is supported with the lower surface coming into contact with the light guide mounting surface 22, and the height from the light guide mounting surface 22 to the upper surface of the light guide 4 and the height (Z-axis direction) of the light guide 4 are made equal.

According to the above configuration, a gap 23 is formed between the upper surface of the light guide 4 and the lid 5b (distance h1 of FIG. 1(a)) or between the lower surface of the light guide 4 and the light guide mounting surface 22 in the region where the light guide 4 is supported. The pressure applied on the light guide 4 when the package 5 is pressurized or vibrated in the up and down direction thus can be reduced. Therefore, the deformation and the damage of the core 10 due to vibration, impact, and the like can be prevented, and a stable light transmission by the film light guide can be realized.

In the configuration in which the light guide 4 is fixed to the lid 5, the surface facing the light guide 4 in the lid 5 becomes the light guide mounting surface (supporting surface, not shown).

Figure 2A:
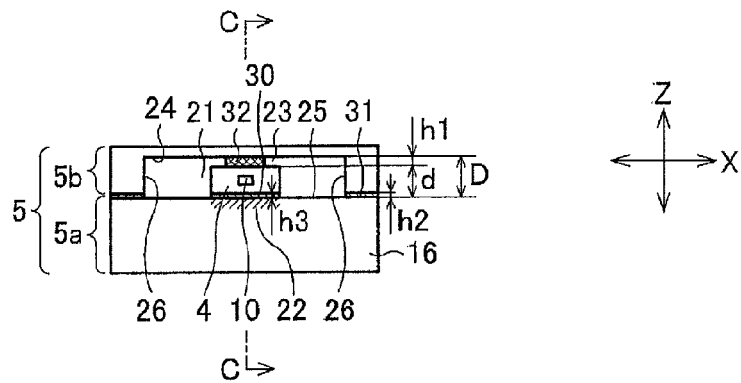
FIG. 2(a) is a view showing a schematic configuration in a case where adhesive is filled in the light guide module shown in FIGS. 1(a) to 1(c), and is a longitudinal cross-sectional view of the light guide module in a state where the light guide is mounted on the package when seen from the light receiving portion side (view taken along line A-A of FIG. 2(b)).
Figure 2B:
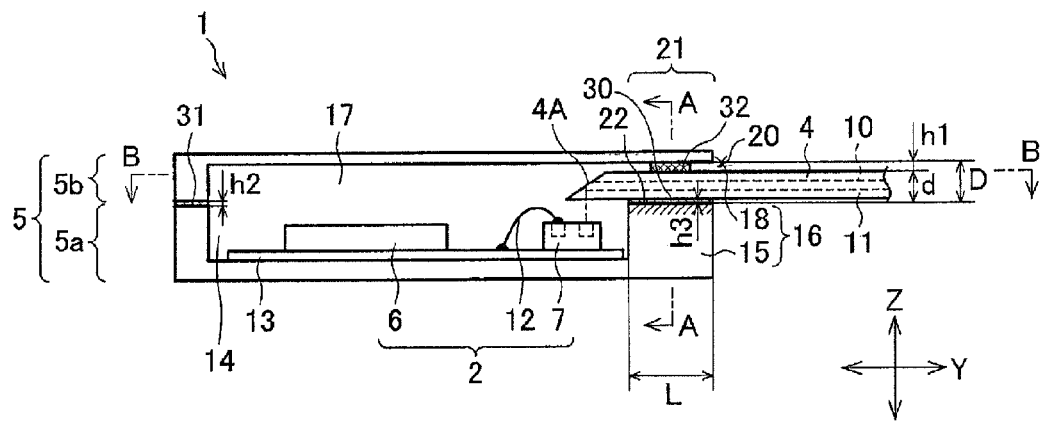
FIG. 2(b) is a view showing a schematic configuration in a case where adhesive is filled in the light guide module shown in FIGS. 1(a) to 1(c), and is a transverse cross-sectional view of the light guide module in a state where the light guide is mounted on the package when seen from the light receiving portion side (view taken along line C-C of FIG. 2(a)).
Figure 2C:
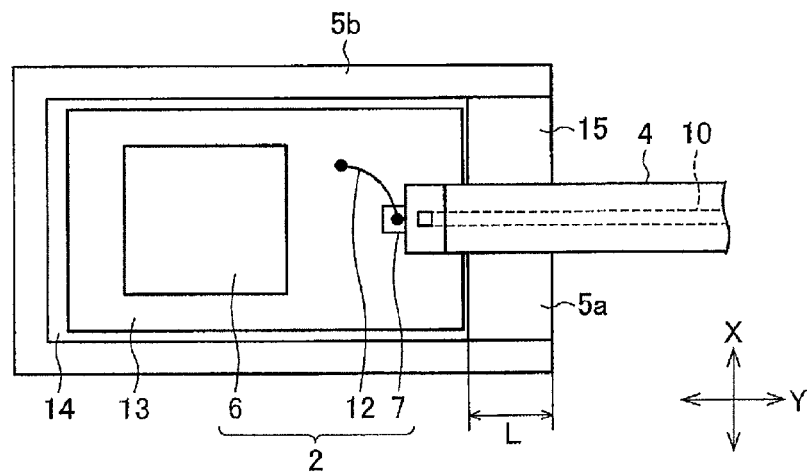
FIG. 2(c) is a view showing a schematic configuration in a case where adhesive is filled in the light guide module shown in FIGS. 1(a) to 1(c), and is a top view of the light guide module in a state where the light guide is mounted on the package when seen from the light receiving portion side (view taken along line B-B of FIG. 2(b)).

The light guide module 1 shown in FIGS. 2(a) to 2(c), on the other hand, has a configuration in which the light guide 4 is fixed to the package 5 with an adhesive in the light guide module 1 shown in FIGS. 1(a) to 1(c). In other words, FIGS. 2(a) to 2(c) show a state where the light guide 4 and the supporting portion 5a, and the light guide 4 and the lid 5b are respectively fixed with an adhesive (first adhesive, second adhesive) in the light guide module 1 shown in FIGS. 1(a) to 1(c).

The method of mounting the light guide 4 in the light guide module 1 shown in FIGS. 2(a) to 2(c) will be described below.

First, the light guide 4 is mounted so as to transverse the side wall 15 on the light guide mounting surface 22 serving as a region of one part at the upper surface of the side wall 15 of the supporting portion 5a. Specifically, the light guide 4 is set at a position where the optical coupling state of the light emitting portion 7 and the light guide 4 becomes satisfactory, that is, the light incident surface 4A is positioned on the normal direction with respect to the light emitting surface of the light emitting portion 7, as shown in FIG. 4(a). The light guide 4 is mounted by applying an adhesive (second adhesive) 30 to a region (light guide mounting surface 22) where the lower surface of the set light guide 4 and the upper surface of the side wall 15 are in contact with each other. Various types of commercially available adhesives can be used for the adhesive 30.

The Young's modulus of the adhesive 30 is smaller than the Young's modulus of the light guide 4, that is, the adhesive 30 is preferably made of a material having higher flexibility than the light guide 4. Specifically, the adhesive is preferably made of resin material softer than the core 10 and the clad 11 of the light guide 4, and in particular, urethane, silicon, or enethiol.

The supporting portion 5a and the lid 5b are then integrated by mounting the side wall of the lid 5b on the upper surface of the supporting portion 5a mounted with the light guide 4.

Specifically, as shown in FIG. 2(b), the outer frames of the supporting portion 5a and the lid 5b are coincided so that the side wall 15 and the side wall 18 that face each other when the support 5a and the lid 5b are integrated become a side wall 16 that forms the package 5, and the corresponding lower surface of each side wall of the lid 5b and the lid mounting surface (shaded region of FIG. 5) of the supporting portion 5a are adhered when coincided. In this case, the lid 5b is mounted and adhered on the supporting portion 5a by the adhesive 31 (FIG. 2(a)) applied to the lower surface of each side wall of the lid 5b.

The lid 5b is mounted so as to accommodate the end including the light incident surface 4A of the light guide 4 in the interior recess 17. In other words, a state is realized in which the light guide 4 transverses the side wall 16 through the opening 20 and is inserted to the interior of the package 5 when seen from the outer side of the package 5. Therefore, when the supporting portion 5a and the lid 5b are integrated, a space interiorly forms in the package 5 by the recess 14 and the recess 17, and the end including the light incident surface 4A of the light guide 4 (hereinafter referred to as the end) is accommodated in the formed interior space.

When the supporting portion 5a and the lid 5b are integrated, a through-hole 21 (FIG. 2(a)) for connecting the interior space and the exterior space of the package 5 forms in the side wall 16 of the package 5.

The through-hole 21 is formed by the opening 20, one part of the upper surface and the side surface of the recess 17 of the lid 5b, and the upper surface of the side wall 15. The shape of the hole of the through-hole 21 is a rectangle, and the length in the Y-axis direction is equal to the length L in the Y-axis direction of the upper surface of the side wall 15, as shown in FIG. 2(b). Thus, the upper surface and the side surface of the recess 17 forming the through-hole 21 refer to the upper surface and the side surface of the recess 17 included in a range of a distance of L from the side wall 18 in the Y-axis direction.

Here, the upper surface and the side surface of the recess 17 forming the through-hole 21 are respectively a through-hole upper surface 24 and a through-hole side surface 26, and a region that is not mounted with the lid 5b at the upper surface of the side wall 15 is a through-hole lower surface 25.

As shown in FIG. 2(a), the gap 23 is formed between the through-hole upper surface 24 and the upper surface of the light guide 4 in the through-hole 21. Specifically, the length of the through-hole side surface 26, that is, the length D from the through-hole lower surface 25 to the through-hole upper surface 24 in the Z-axis direction (first direction) is set to be greater than the length d from the through-hole lower surface 25 to the upper surface of the light guide 4.

The length h1 in the Z-axis direction of the gap 23 corresponds to a difference (D−d) of the length D from the through-hole lower surface 25 to the through-hole upper surface 24 (hereinafter simply referred to as the length D) and the length d from the through-hole lower surface 25 to the upper surface of the light guide 4 (hereinafter simply referred to as the length d).

The length D and the length d from the through-hole lower surface 25 also include a thickness h3 in the Z-axis direction of the adhesive 30, as shown in FIG. 2(a).

As shown in FIGS. 2(a) and 2(b), the adhesive (first adhesive) 32 is filled in the region of one part of the gap 23, so that the adhesive 32 adheres the upper surface of the light guide 4 and the through-hole upper surface 24. The Young's modulus of the adhesive 32 is smaller than the Young's modulus of the light guide 4, that is, the adhesive 32 is made of a material having higher flexibility than the light guide 4. Specifically, it is preferably made of resin material softer than the core 10 and the clad 11 of the light guide 4, and in particular, it is preferably urethane, silicon, or enethiol.

The length h1 (thickness) in the Z-axis direction of the adhesive 32 equal to the length in the Z-axis direction of the gap 23 is greater than the length h2 in the Z-axis direction of the adhesive 31.

According to the above configuration, the force exerted on the light guide 4 by the deformation of the lid 5b or the supporting portion 5a due to temperature change, vibration impact, and the like can be absorbed since the adhesive 32 has higher flexibility than the light guide 4. In other words, the adhesive 32 plays the role of a cushion from the vibration impact and the like. Therefore, the deformation and the damage of the core 10 can be prevented even when the package 5 is subjected to the vibration impact and the like.

The adhesive 30, the adhesive 31, and the adhesive 32 may be made of the same material, or may be made of different materials. If made of different materials, the adhesive 30 and the adhesive 32 preferably have higher flexibility than the adhesive 31.

In the present embodiment, a case in which only one through-hole 21 is formed in the side wall of the package 5 has been described, but the present invention is not limited thereto, and two or more through-holes 21 may be formed in the side wall 16 by partitioning the recess 17 of the lid 5b into two, for example, so that the adhesive 32 is filled to the gap 23 of the respective through-hole 21. If the through-hole 21 is formed in plurals, the plurality of through-holes 21 may be formed in the same side wall of the package 5, or may be formed in different side walls. According to the above configuration, the present invention is applicable even to a case in which two or more light guides are supported with one package.

The outer shape of the package 5 of the present embodiment is a rectangular solid shape, but the present invention is not limited thereto, and may be a polyhedron of a shape in which four corners of the package 5 are scraped off. In other words, the package of the present invention may be configured by four or more side walls.

Furthermore, in the present embodiment, the lid 5b and the supporting portion 5a are adhered with the adhesive 31, and the light guide 4 and the package 5 are adhered with the adhesive 30 and the adhesive 32, but the present invention is not limited thereto, and a configuration of using a resin sealing agent in place of the adhesive may be adopted.

The length h1 in the Z-axis direction between the upper surface of the light guide 4 and the through-hole upper surface 24 (gap 23), that is, the thickness h1 in the Z-direction of the adhesive 32 is preferably greater than or equal to 5 μm. The thickness h3 in the Z-direction of the adhesive 30 is preferably greater than or equal to 5 μm.

According to the above configuration, the influence of the deformation of the lid and the supporting portion, which is caused by vibration impact and temperature change, on the film light guide can be reduced since the thickness h1 in the Z-axis direction of the adhesive 32 or the thickness h3 in the Z-axis direction of the adhesive 30 become large. Therefore, the deformation and the damage of the core can be prevented even when the vibration impact and the temperature change are large.

In the package 5 of the light guide module 1 according to the present embodiment, the length in a third direction (X-axis direction) perpendicular to the first direction (Z-axis direction) at the opening 20 of the through-hole 21 is preferably longer than the length in the third direction at a cross-section perpendicular to the second direction (Y-axis direction) of the light guide 4 passing through the side wall 16. Therefore, a gap can be formed not only in the up and down direction but also in the left and right direction, and the adhesive 32 can be filled thereto, so that the deformation and the damage of the core 10 can be prevented even when subjected to the vibration impact from the left and right direction.

Moreover, the length in the Z-axis direction of the adhesive 32 equal to the length h1 in the Z-axis direction of the gap 23 is greater than the thickness h2 in the Z-axis direction of the adhesive 31 in the present embodiment, but the present invention is not limited thereto. For example, the h1 may be smaller than the thickness h2 in the Z-axis direction of the adhesive 31, and the thickness h3 in the Z-axis direction of the adhesive 30 may be greater than the thickness h2 in the Z-axis direction of the adhesive 31. Both h1 and h3 may be greater than h2. A configuration may be adopted in which the sum (h1+h3) of the thicknesses h1 and h3 is greater than h2, that is, a relational expression of (h1+h3)>h2 is satisfied.

In the above description, the configuration in which the light guide 4 is fixed to both the supporting portion 5a and the lid 5b by the adhesive 32 and the adhesive 30 has been described, but the present invention is not limited thereto, and it merely needs to be fixed to either one of the supporting portion 5a or the lid 5b. In other words, the light guide 4 and the package 5 merely need to be fixed by at least one of the adhesive 32 filled in a region of at least one part of the region between the lid 5b and the light guide 4, or the adhesive 30 filled in a region of at least one part of the region between the light guide 4 and the supporting portion 5a.

The light guide 4 of the present invention merely needs to be made from a raw material softer than at least one of the adhesive 30 or the adhesive 32.

Variants of the package 5 according to the present embodiment will be described below with reference to FIG. 6(a) to FIG. 25.

(First Variant)

Figure 6A:
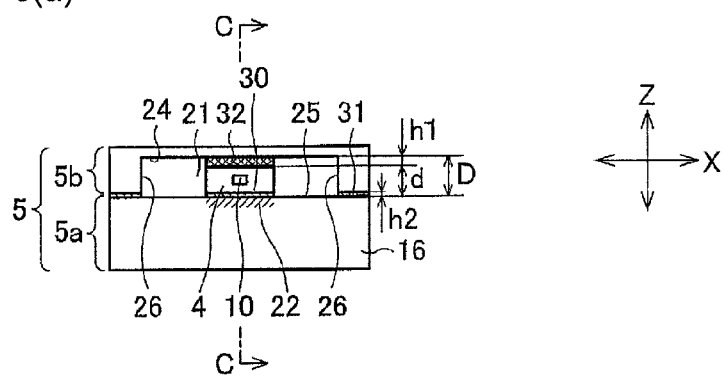
FIG. 6(a) is a longitudinal cross-sectional view (view taken along line A-A of FIG. 6(b)) showing a schematic configuration of the light guide module when the light guide module, in which the light guide is mounted in a package serving as a first variant, is seen from the light receiving portion side.
Figure 6B:
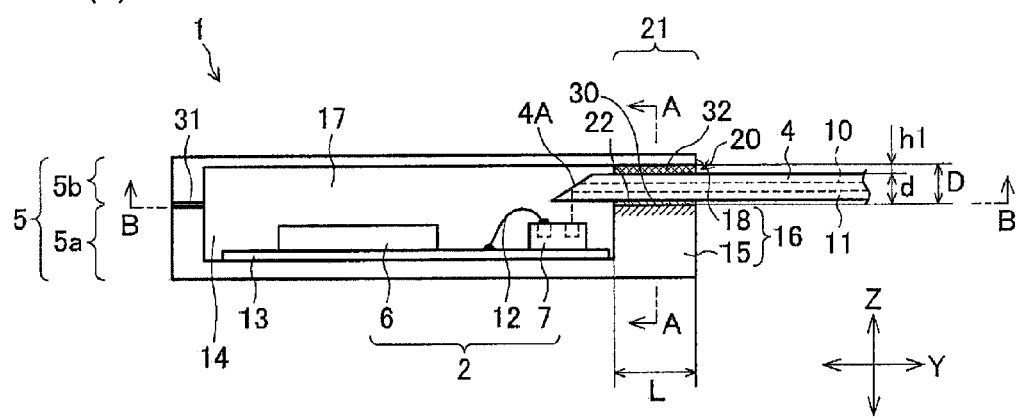
FIG. 6(b) is a transverse cross-sectional view (view taken along line C-C of FIG. 6(a)) showing a schematic configuration of the light guide module when the light guide module, in which the light guide is mounted in a package serving as the first variant, is seen from the light receiving portion side.
Figure 6C:
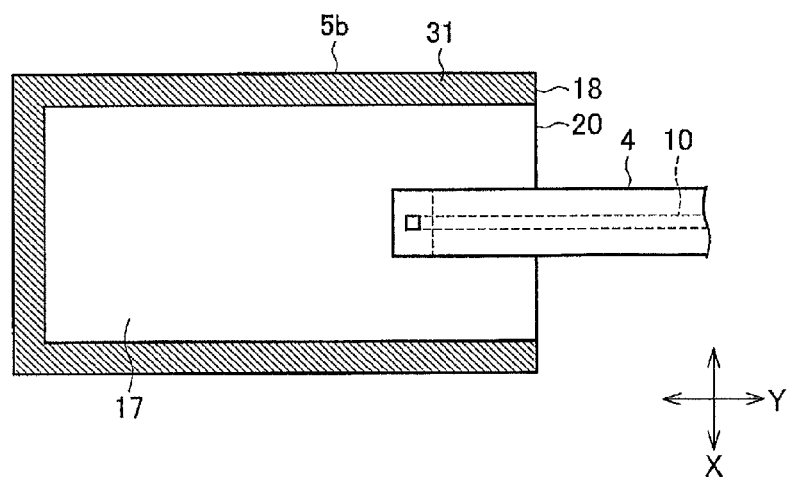
FIG. 6(c) is a top view (view taken along line B-B of FIG. 6(b)) showing a schematic configuration of the light guide module when the light guide module, in which the light guide is mounted in a package serving as the first variant, is seen from the light receiving portion side.

FIG. 6(a) is a longitudinal cross-sectional view (view taken along line A-A of FIG. 6(b)) showing a schematic configuration of the light guide module 1 when the light guide module 1, in which the light guide is mounted in a package serving as a first variant, is seen from the light receiving portion 9 side, FIG. 6(b) is a transverse cross-sectional view (view taken along line C-C of FIG. 6(a)) showing a schematic configuration of the light guide module 1, and FIG. 6(c) is a top view (view taken along line B-B of FIG. 6(b)) showing a schematic configuration of the light guide module 1.

In FIGS. 2(a) to 2(c), only the spatial region of one part of the gap 23 between the through-hole upper surface 24 and the upper surface of the light guide 4 is filled with the adhesive 32, but the present invention is not limited thereto. For example, all the spatial regions of the gap 23 may be filled with the adhesive 32, as shown in FIG. 6(a).

According to the above configuration, the region filled with the adhesive 32 that plays a role of a cushion from vibration impact and the like is large, and thus the deformation and the damage of the core 10 by stronger vibration impact and the like can be prevented.

(Second Variant)

Figure 7A:
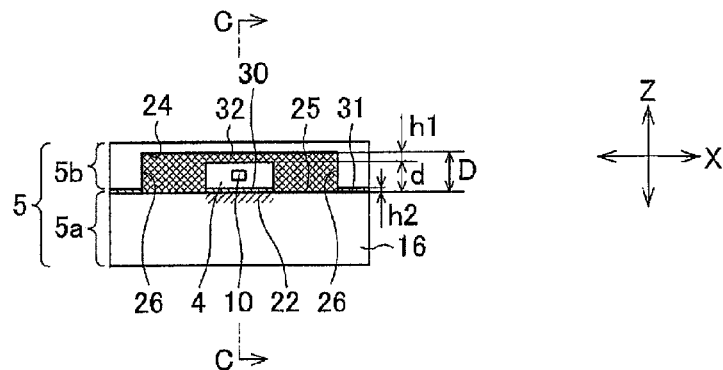
FIG. 7(a) is a longitudinal cross-sectional view (view taken along line A-A of FIG. 7(b)) showing a schematic configuration of the light guide module when the light guide module, in which the light guide is mounted in a package serving as a second variant, is seen from the light receiving portion side.
Figure 7B:
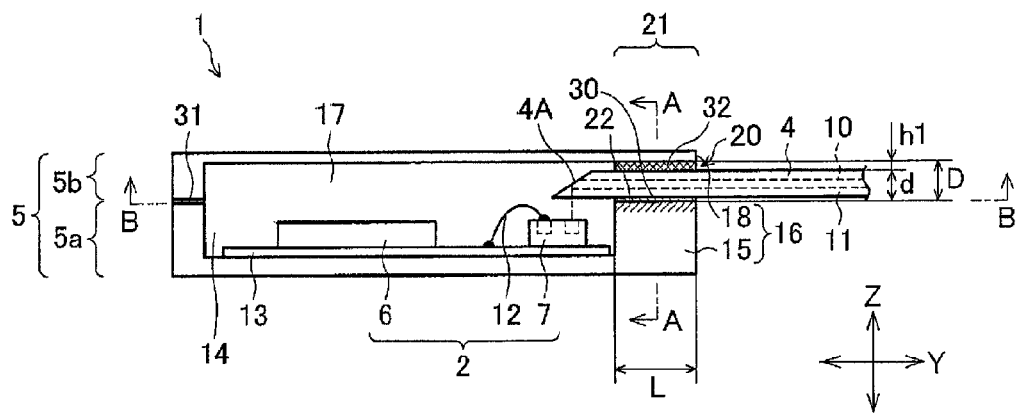
FIG. 7(b) is a transverse cross-sectional view (view taken along line C-C of FIG. 7(a)) showing a schematic configuration of the light guide module when the light guide module, in which the light guide is mounted in a package serving as the second variant, is seen from the light receiving portion side.
Figure 7C:
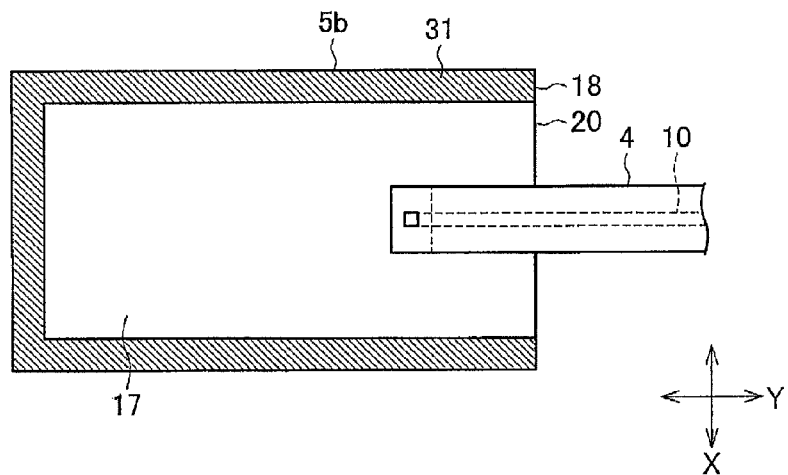
FIG. 7(c) is a top view (view taken along line B-B of FIG. 7(b)) showing a schematic configuration of the light guide module when the light guide module, in which the light guide is mounted in a package serving as the second variant, is seen from the light receiving portion side.

FIG. 7(a) is a longitudinal cross-sectional view (view taken along line A-A of FIG. 7(b)) showing a schematic configuration of the light guide module 1 when the light guide module 1, in which the light guide is mounted in a package serving as a second variant, is seen from the light receiving portion 9 side, FIG. 7(b) is a transverse cross-sectional view (view taken along line C-C of FIG. 7(a)) showing a schematic configuration of the light guide module 1, and FIG. 7(c) is a top view (view taken along line B-B of FIG. 7(b)) showing a schematic configuration of the light guide module 1.

In FIGS. 2(a) to 2(c) and FIGS. 6(a) to 6(c), one part of or all of the region in the gap 23 between the through-hole upper surface 24 and the upper surface of the light guide 4 is filled with the adhesive 32, but the present invention is not limited thereto. For example, all the spatial regions other than the region of the light guide 4 in the spatial regions of the through-hole 21 may be filled with the adhesive 32, as shown in FIGS. 7(a) and 7(b). All the spatial regions other than the region of the light guide 4 in the spatial regions of the through-hole 21 may be filled with the adhesive 30.

According to the above configuration, the influence of the vibration impact from the left and right direction orthogonal to the up and down direction at the through-hole 21, that is, the X-axis direction on the light guide 4 can be reduced. Thus, the deformation and the damage of the core by vibration impact and the like from the side surface of the package 5 can be prevented, and a more stable light transmission can be realized.

Furthermore, dust, powder dust, moisture, and the like are prevented from entering from the exterior of the package 5 to the interior of the package 5 since the spatial region in the through-hole 21 is sealed with the adhesive 32.

(Third Variant)

Figure 8A:
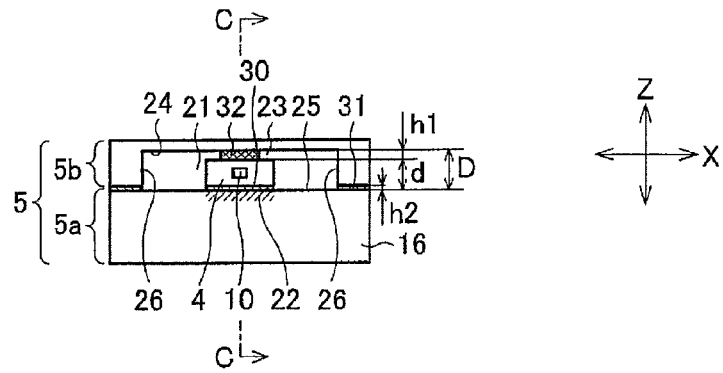
FIG. 8(a) is a longitudinal cross-sectional view (view taken along line A-A of FIG. 8(b)) showing a schematic configuration of the light guide module when the light guide module, in which the light guide is mounted in a package serving as a third variant, is seen from the light receiving portion side.
Figure 8B:
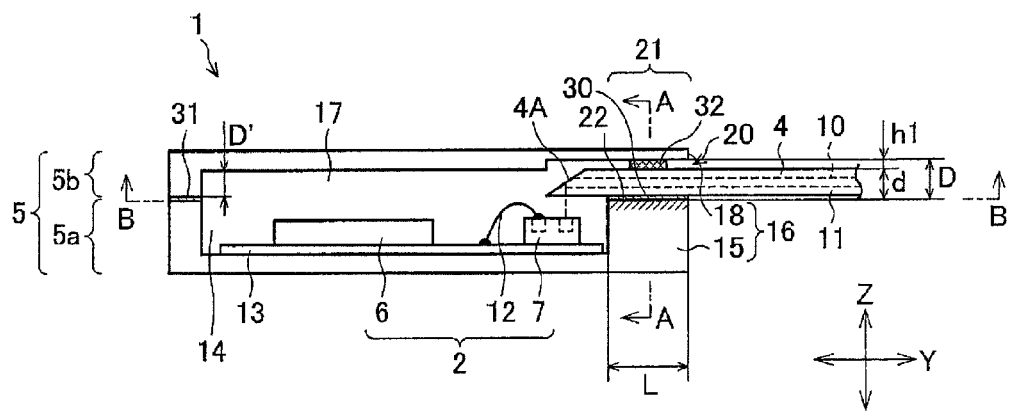
FIG. 8(b) is a transverse cross-sectional view (view taken along line C-C of FIG. 8(a)) showing a schematic configuration of the light guide module when the light guide module, in which the light guide is mounted in a package serving as the third variant, is seen from the light receiving portion side.
Figure 8C:
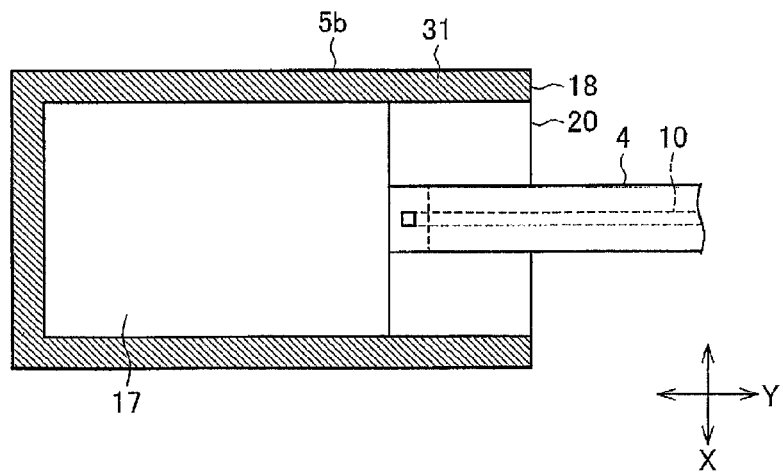
FIG. 8(c) is a top view (view taken along line B-B of FIG. 8(b)) showing a schematic configuration of the light guide module when the light guide module, in which the light guide is mounted in a package serving as the third variant, is seen from the light receiving portion side.

FIG. 8(a) is a longitudinal cross-sectional view (view taken along line A-A of FIG. 8(b)) showing a schematic configuration of the light guide module 1 when the light guide module 1, in which the light guide is mounted in a package serving as a third variant, is seen from the light receiving portion 9 side, FIG. 8(b) is a transverse cross-sectional view (view taken along line C-C of FIG. 8(a)) showing a schematic configuration of the light guide module 1, and FIG. 8(c) is a top view (view taken along line B-B of FIG. 8(b)) showing a schematic configuration of the light guide module 1.

In the through-hole 21 of the present embodiment, the length D of the side surface of the recess 17 serving as the length of the through-hole side surface 26 in the Z-axis direction is greater than the length d from the through-hole lower surface 25 to the upper surface of the light guide 4, that is, the condition of length D>length d is satisfied.

However, the length of the side surface of the recess 17 not included in the range of distance of L from the side wall 18 in the Y-axis direction in the package 5 of the present invention does not need to satisfy the condition length D>length d since the through-hole 21 is not formed, and the length D may be smaller than or equal to the length d.

For example, as shown in FIGS. 8(b) and 8(c), the length D of the side surface of the recess 17 that forms the through-hole 21 merely needs to be greater than the length d, and the length D' of the side surface of the recess 17 that does not form the through-hole 21 may be smaller than or equal to the length d if the length in the Z-axis direction of the side surface of the recess 17 at the lid 5b is formed in two stages.

(Fourth Variant)

Figure 9A:
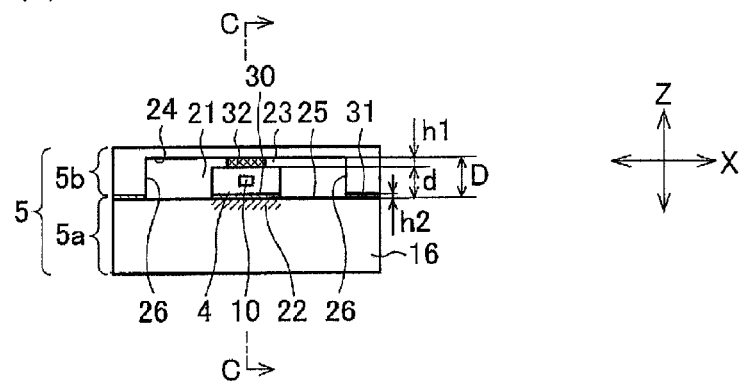
FIG. 9(a) is a longitudinal cross-sectional view (view taken along line A-A of FIG. 9(b)) showing a schematic configuration of the light guide module when the light guide module, in which the light guide is mounted in a package serving as a fourth variant, is seen from the light receiving portion side.
Figure 9B:
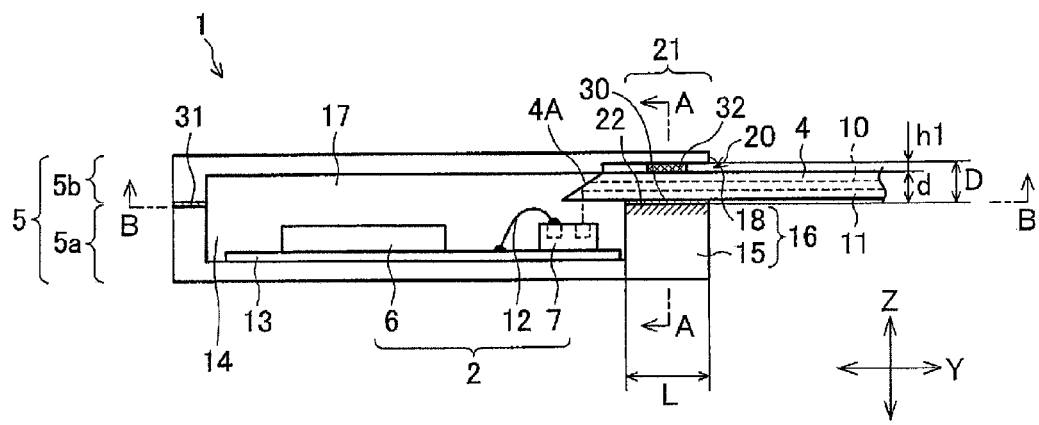
FIG. 9(b) is a transverse cross-sectional view (view taken along line C-C of FIG. 9(a)) showing a schematic configuration of the light guide module when the light guide module, in which the light guide is mounted in a package serving as the fourth variant, is seen from the light receiving portion side.
Figure 9C:
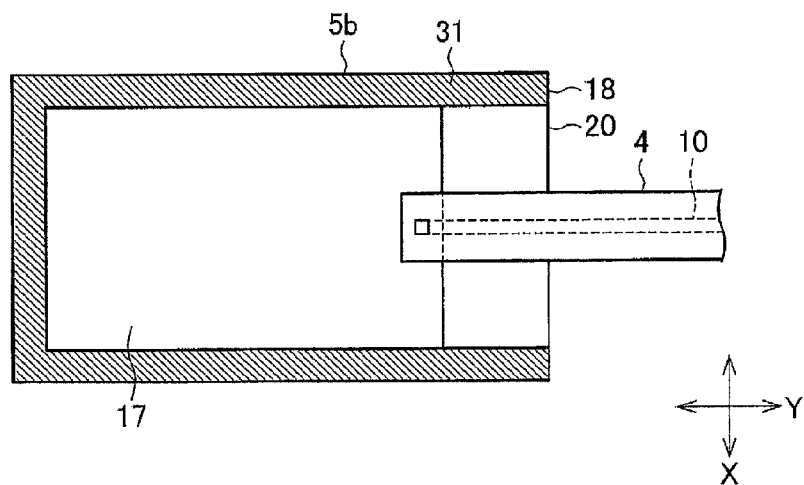
FIG. 9(c) is a top view (view taken along line B-B of FIG. 9(b)) showing a schematic configuration of the light guide module when the light guide module, in which the light guide is mounted in a package serving as the fourth variant, is seen from the light receiving portion side.

FIG. 9(a) is a longitudinal cross-sectional view (view taken along line A-A of FIG. 9(b)) showing a schematic configuration of the light guide module 1 when the light guide module 1, in which the light guide is mounted in a package serving as a fourth variant, is seen from the light receiving portion 9 side, FIG. 9(b) is a transverse cross-sectional view (view taken along line C-C of FIG. 9(a)) showing a schematic configuration of the light guide module 1, and FIG. 9(c) is a top view (view taken along line B-B of FIG. 9(b)) showing a schematic configuration of the light guide module 1.

The package 5 of the present invention may be configured to a shape shown in FIGS. 9(a) to 9(c).

Specifically, the length in the Z-axis direction of the side surface of the recess 17 in the lid 5b is formed in two-stages as in the third variant, but the position (hereinafter referred to as step difference position) with a step difference in the length in the Z-axis direction of the side surface of the recess 17 may exist on the through-hole 21 side than the package 5 of the third variant 3 shown in FIGS. 8(a) to 8(c).

The package 5 of the present invention may have the upper surface of recess 17 and the upper surface of the light guide 4 which are in contact with each other at the step-difference position, since the upper surface of the recess 17 and the light guide 4 merely should not be in contact with each other in the through-hole 21.

Figure 10A:
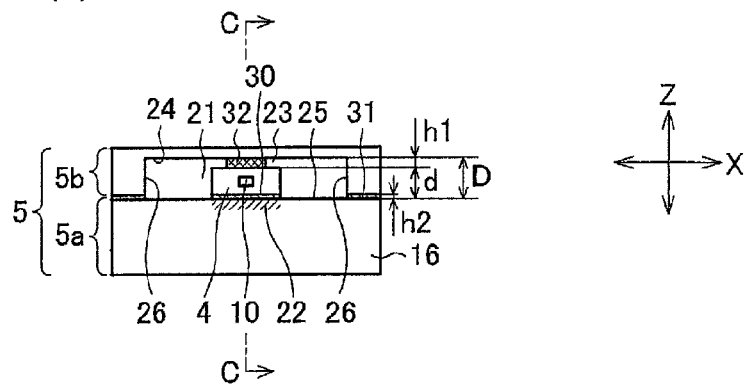
FIG. 10(a) is a longitudinal cross-sectional view (view taken along line A-A of FIG. 10(b)) showing a schematic configuration of the light guide module when the light guide module, in which the light guide is mounted in a package serving as another configuration of the third variant and the fourth variant, is seen from the light receiving portion side.
Figure 10B:
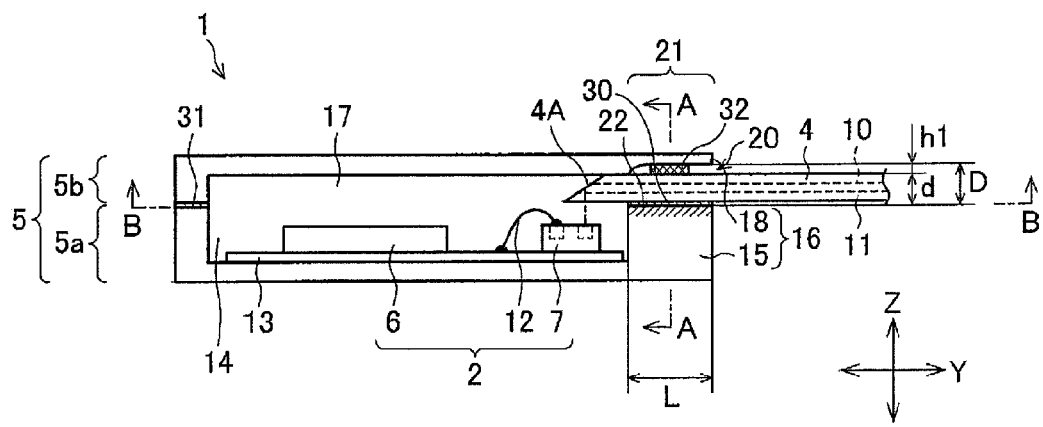
FIG. 10(b) is a transverse cross-sectional view (view taken along line C-C of FIG. 10(a)) showing a schematic configuration of the light guide module when the light guide module, in which the light guide is mounted in a package serving as another configuration of the third variant and the fourth variant, is seen from the light receiving portion side.
Figure 10C:
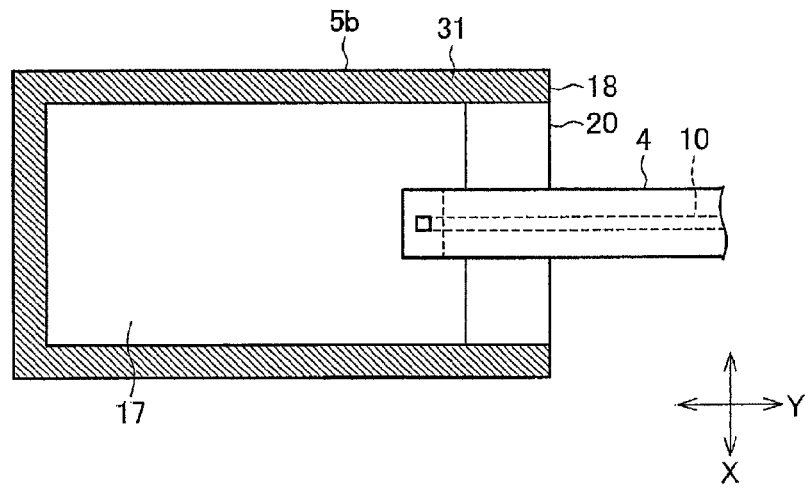
FIG. 10(c) is a top view (view taken along line B-B of FIG. 10(b)) showing a schematic configuration of the light guide module when the light guide module, in which the light guide is mounted in a package serving as another configuration of the third variant and the fourth variant, is seen from the light receiving portion side.

Furthermore, the package 5 of the present invention is not limited to a case in which the step difference portion of two-stages in the length in the Z-axis direction of the side surface of the recess 17 of the lid 5b is formed to a step-wise shape as in the third variant and the fourth variant, and such a portion may be formed to a tapered shape as shown in FIGS. 10(a) to 10(c). FIG. 10(a) is a longitudinal cross-sectional view (view taken along line A-A of FIG. 10(b)) showing a schematic configuration of the light guide module 1 when the light guide module 1, in which the light guide is further modified from the third variant and the fourth variant, is seen from the light receiving portion 9 side, FIG. 10(b) is a transverse cross-sectional view (view taken along line C-C of FIG. 10(a)) showing a schematic configuration of the light guide module 1, and FIG. 10(c) is a top view (view taken along line B-B of FIG. 10(b)) showing a schematic configuration of the light guide module 1.

(Fifth Variant)

Figure 11A:
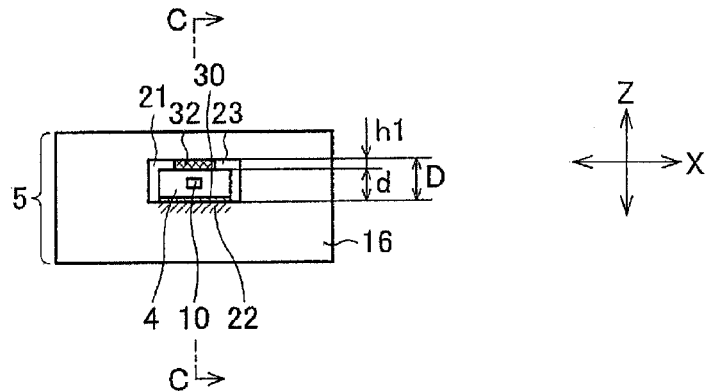
FIG. 11(a) is a longitudinal cross-sectional view (view taken along line A-A of FIG. 11(b)) showing a schematic configuration of the light guide module when the light guide module, in which the light guide is mounted in a package serving as a fifth variant, is seen from the light receiving portion side.
Figure 11B:
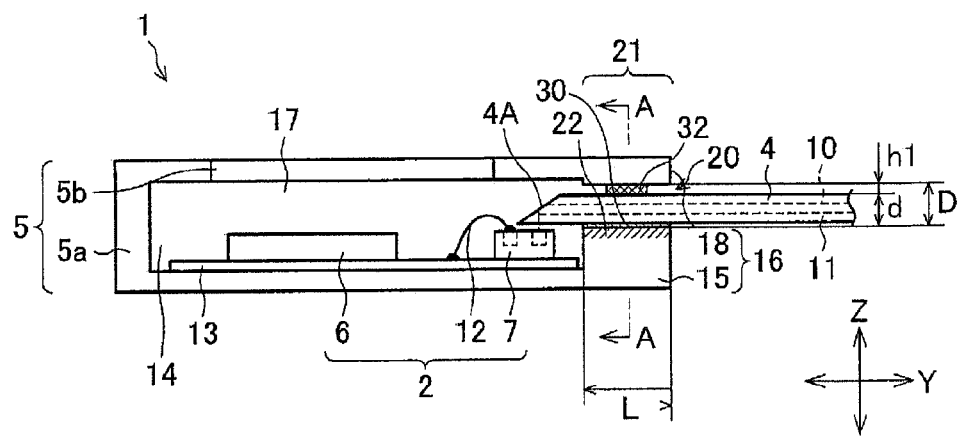
FIG. 11(b) is a transverse cross-sectional view (view taken along line C-C of FIG. 11(a)) showing a schematic configuration of the light guide module when the light guide module, in which the light guide is mounted in a package serving as the fifth variant, is seen from the light receiving portion side.

The package 5 of the present embodiment has a configuration in which the through-hole 21 is formed after the supporting portion 5a and the lid 5b are integrated, but the present invention is not limited thereto, and the through-hole 21 may be formed in one side wall 16 of the supporting portion 5a from the beginning, as shown in FIGS. 11(a) and 11(b). FIG. 11(a) is a longitudinal cross-sectional view (view taken along line A-A of FIG. 11(b)) showing a schematic configuration of the light guide module 1 when the light guide module 1, in which the light guide is mounted on a package serving as a fifth variant, is seen from the light receiving portion 9 side, and FIG. 11(b) is a transverse cross-sectional view (view taken along line C-C of FIG. 11(a)) showing a schematic configuration of the light guide module 1.

(Sixth Variant)

Figure 12A:
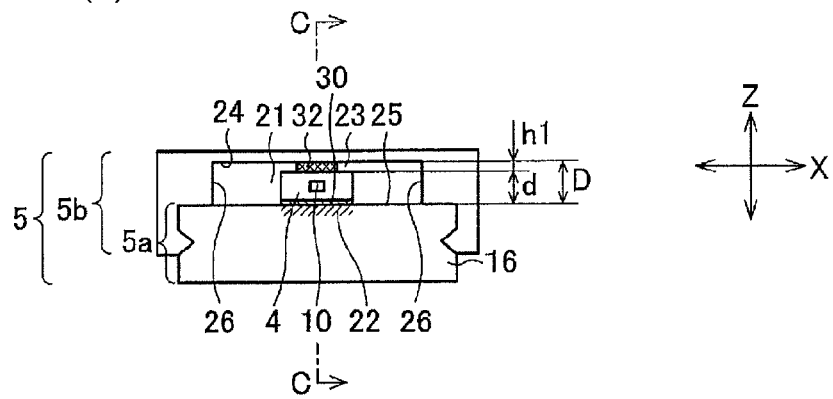
FIG. 12(a) is a longitudinal cross-sectional view (view taken along line A-A of FIG. 12(b)) showing a schematic configuration of the light guide module when the light guide module, in which the light guide is mounted in a package serving as a sixth variant, is seen from the light receiving portion side.
Figure 12B:
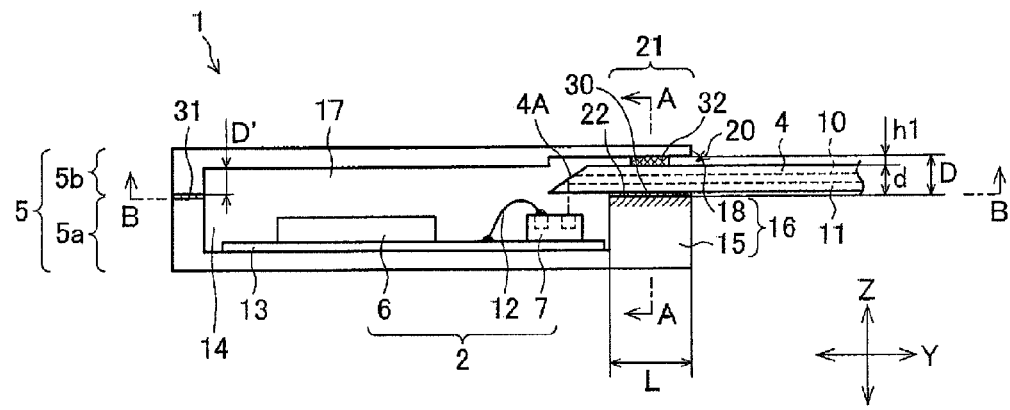
FIG. 12(b) is a transverse cross-sectional view (view taken along line C-C of FIG. 12(a)) showing a schematic configuration of the light guide module when the light guide module, in which the light guide is mounted in a package serving as the sixth variant, is seen from the light receiving portion side.
Figure 12C:
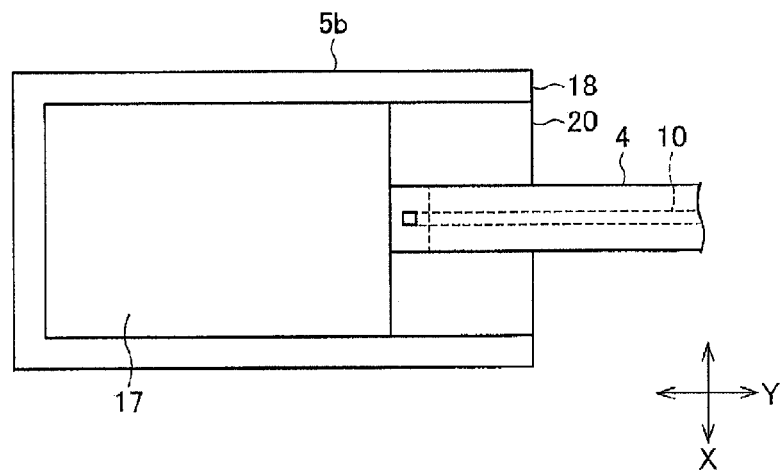
FIG. 12(c) is a top view (view taken along line B-B of FIG. 12(b)) showing a schematic configuration of the light guide module when the light guide module, in which the light guide is mounted in a package serving as the sixth variant, is seen from the light receiving portion side.
Figure 13A:
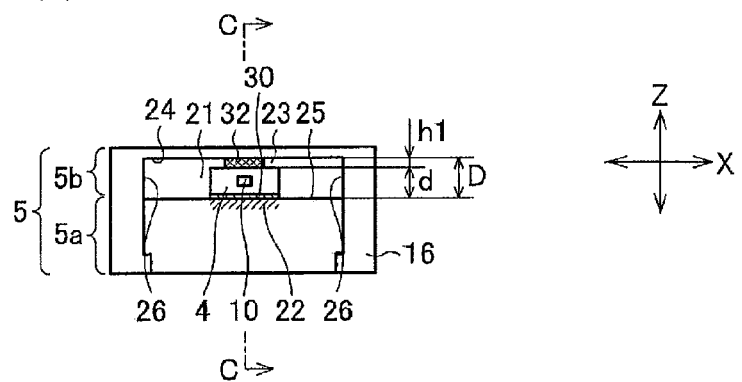
FIG. 13(a) is a longitudinal cross-sectional view (view taken along line A-A of FIG. 13(b)) showing a schematic configuration of the light guide module when the light guide module, in which the light guide is mounted in a package serving as another configuration of the sixth variant, is seen from the light receiving portion side.
Figure 13B:
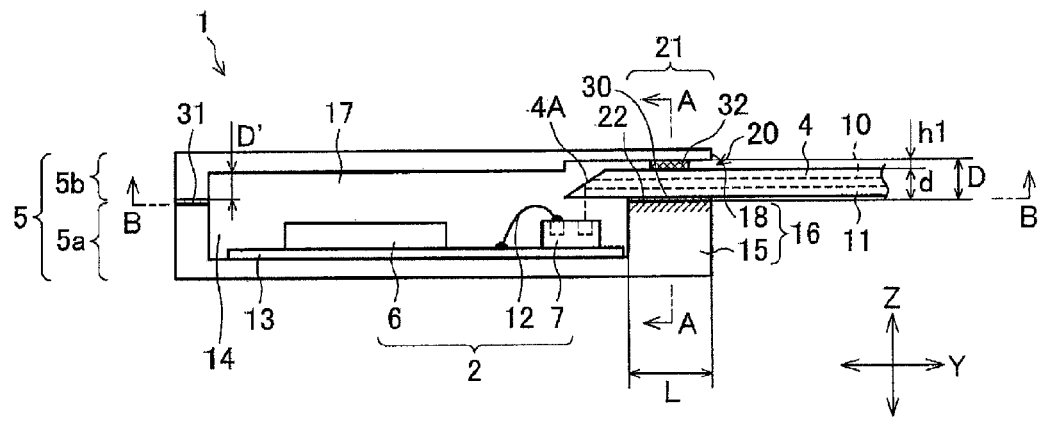
FIG. 13(b) is a transverse cross-sectional view (view taken along line C-C of FIG. 13(a)) showing a schematic configuration of the light guide module when the light guide module, in which the light guide is mounted in a package serving as another configuration of the sixth variant, is seen from the light receiving portion side.
Figure 13C:
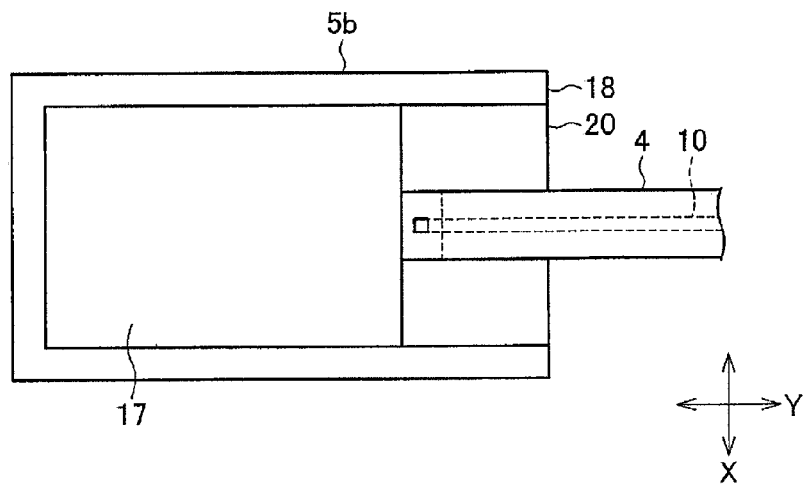
FIG. 13(c) is a top view (view taken along line B-B of FIG. 13(b)) showing a schematic configuration of the light guide module when the light guide module, in which the light guide is mounted in a package serving as another configuration of the sixth variant, is seen from the light receiving portion side.

The package 5 of the present embodiment has a configuration in which the supporting portion 5a and the lid 5b are adhered with the adhesive 31, but the present invention is not limited thereto. FIG. 12(a) is a longitudinal cross-sectional view (view taken along line A-A of FIG. 12(b)) showing a schematic configuration of the light guide module 1 when the light guide module 1, in which the light guide 4 is mounted on the package 5 serving as a sixth variant, is seen from the light receiving portion 9 side, FIG. 12(b) is a transverse cross-sectional view (view taken along line C-C of FIG. 12(a)) showing a schematic configuration of the light guide module 1, and FIG. 12(c) is a top view (view taken along line B-B of FIG. 12(b)) showing a schematic configuration of the light guide module 1. FIGS. 13(a) to 13(c) are views showing other configurations of the light guide module 1 shown in FIGS. 12(a) to 12(c).

As shown in FIGS. 12(a) to 12(c) and FIGS. 13(a) to 13(c), a fastener part is formed at the lower surface of at least a pair of opposing side walls of the lid 5b, and a fastener receiving part is formed at the supporting portion 5a to correspond to the fastener part, so that the supporting portion 5a and the lid 5b are integrated by fitting the relevant parts. FIGS. 12(a) to 12(c) show a configuration in which the fastener receiving part is formed near the middle of the side wall of the supporting portion 5a, and FIGS. 13(a) to 13(c) show a configuration in which the fastener receiving part is formed at the lower surface side of the side wall of the supporting portion 5a. Here, the adhesive 32 is applied to the upper surface of the light guide 4 so that the gap 23 is filled with the adhesive 32, and then the lid 5b is fitted to the supporting portion 5a.

Figure 14A:
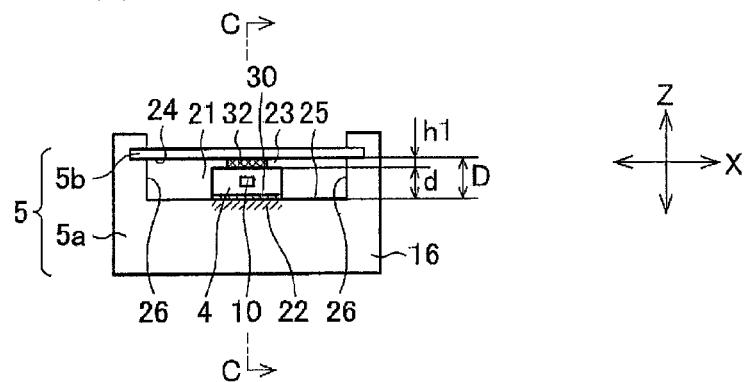
FIG. 14(a) is a longitudinal cross-sectional view (view taken along line A-A of FIG. 14(b)) showing a schematic configuration of the light guide module when the light guide module, in which the light guide is mounted in a package serving as still another configuration of the sixth variant, is seen from the light receiving portion side.
Figure 14B:
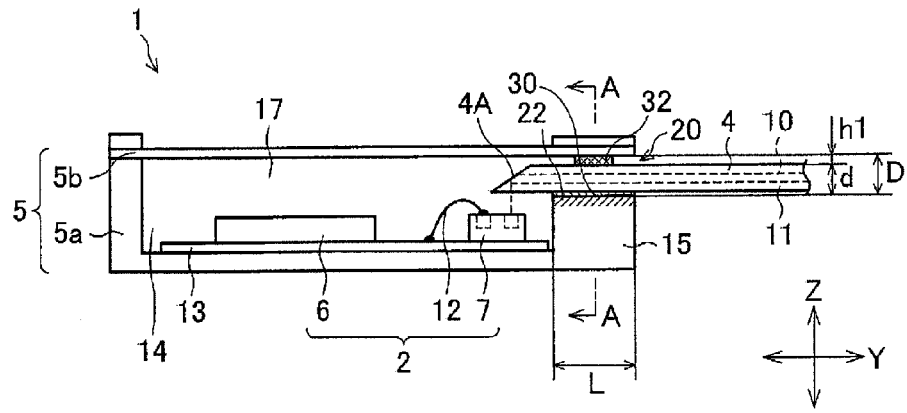
FIG. 14(b) is a transverse cross-sectional view (view taken along line C-C of FIG. 14(a)) showing a schematic configuration of the light guide module when the light guide module, in which the light guide is mounted in a package serving as yet another configuration of the sixth variant, is seen from the light receiving portion side.

As shown in FIGS. 14(a) and 14(b), a configuration in which the lid 5b slidably opens and closes may be adopted. In this case, the adhesive 32 is applied to the upper surface of the light guide 4 in advance so that the gap 23 is filled with the adhesive 32, and then the package 5 is sealed with the lid 5b.

Figure 15A:
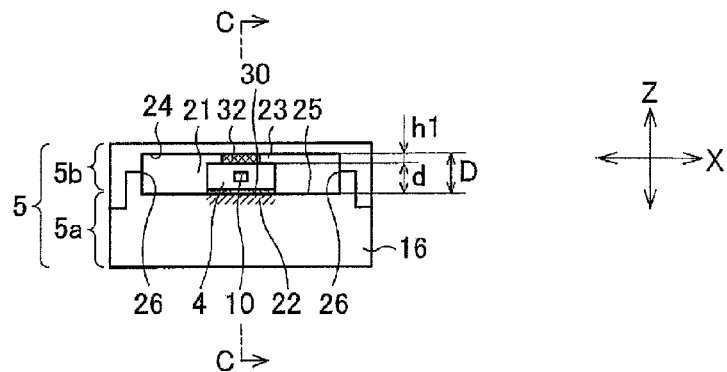
FIG. 15(a) is a longitudinal cross-sectional view (view taken along line A-A of FIG. 15(b)) showing a schematic configuration of the light guide module when the light guide module, in which the light guide is mounted in a package serving as yet another configuration of the sixth variant, is seen from the light receiving portion side.
Figure 15B:
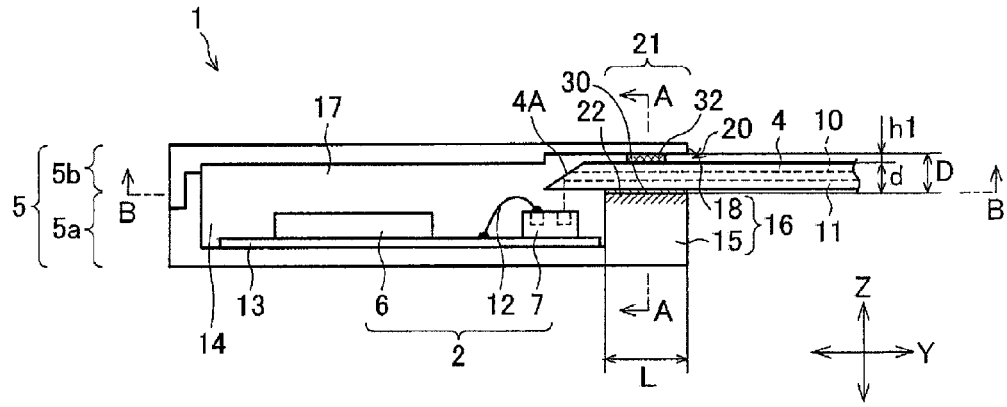
FIG. 15(b) is a transverse cross-sectional view (view taken along line C-C of FIG. 15(a)) showing a schematic configuration of the light guide module when the light guide module, in which the light guide is mounted in a package serving as yet another configuration of the sixth variant, is seen from the light receiving portion side.
Figure 15C:
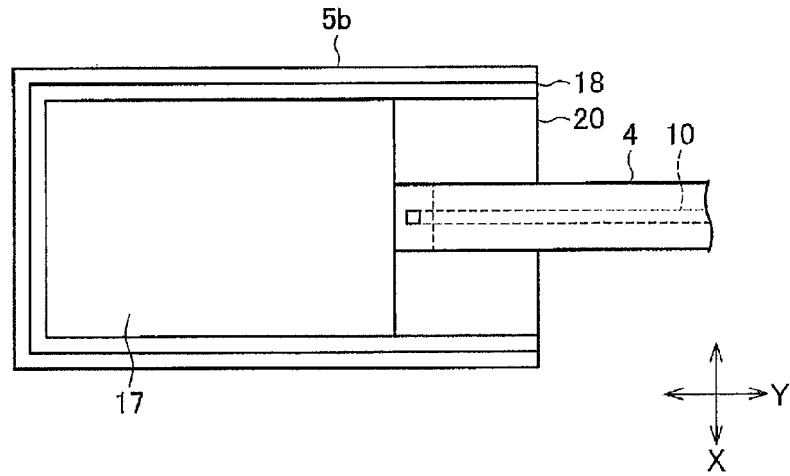
FIG. 15(c) is a top view (view taken along line B-B of FIG. 15(b)) showing a schematic configuration of the light guide module when the light guide module, in which the light guide is mounted in a package serving as yet another configuration of the sixth variant, is seen from the light receiving portion side.

As shown in FIGS. 15(a) to 15(c), a rib may be formed on the upper surface side (Z-axis direction) of the supporting portion 5a, and the lid 5b may be mounted so as to engage thereto. In this case as well, the adhesive 32 is applied to the upper surface of the light guide 4 so that the gap 23 is filled with the adhesive 32, and then the lid 5b is fitted to the supporting portion 5a.

Figure 16A:
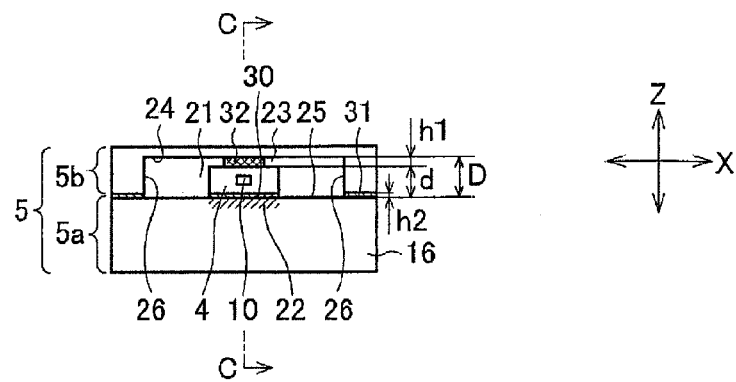
FIG. 16(a) is a longitudinal cross-sectional view (view taken along line A-A of FIG. 16(b)) showing a schematic configuration of the light guide module when the light guide module, in which the light guide is mounted in a package serving as yet another configuration of the sixth variant, is seen from the light receiving portion side.
Figure 16B:
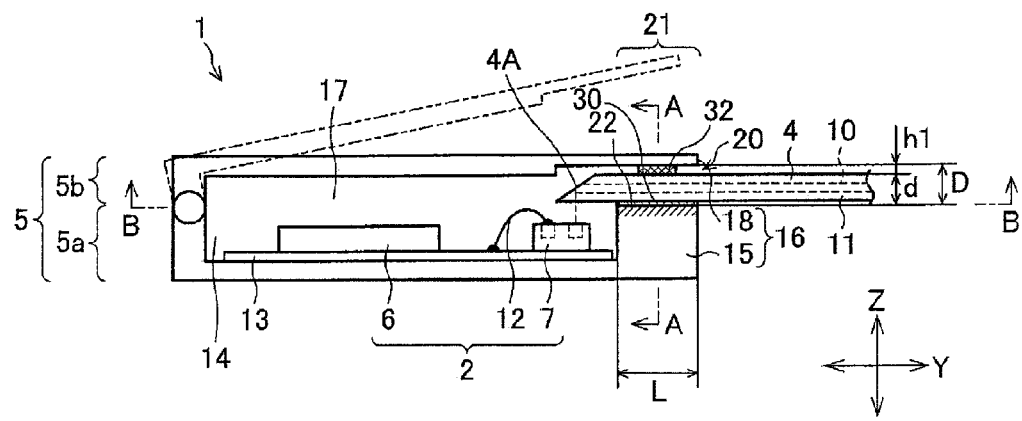
FIG. 16(b) is a transverse cross-sectional view (view taken along line C-C of FIG. 16(a)) showing a schematic configuration of the light guide module when the light guide module, in which the light guide is mounted in a package serving as yet another configuration of the sixth variant, is seen from the light receiving portion side.
Figure 16C:
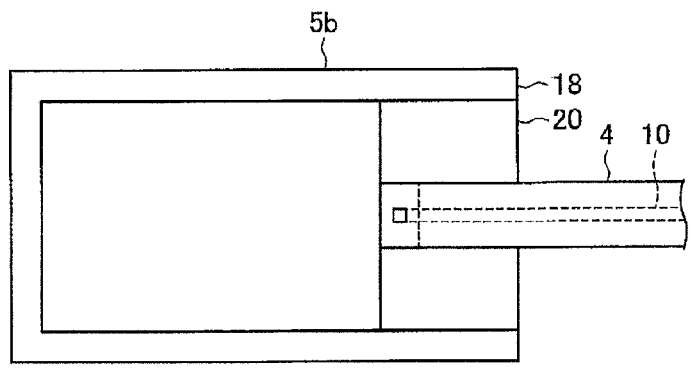
FIG. 16(c) is a top view (view taken along line B-B of FIG. 16(b)) showing a schematic configuration of the light guide module when the light guide module, in which the light guide is mounted in a package serving as yet another configuration of the sixth variant, is seen from the light receiving portion side.

Furthermore, as shown in FIGS. 16(a) to 16(c), a rotation shaft may be arranged on the upper surface side of the side wall facing the side wall 15 of the supporting portion 5a in the Y-axis direction, and the lid 5b may be coupled with the supporting portion 5a in an openable/closable manner by such a rotation shaft. In this case as well, the adhesive 32 is applied to the upper surface of the light guide 4 in advance so that the gap 23 is filled with the adhesive 32, and then the package 5 is sealed with the lid 5b.

(Seventh Variant)

Figure 17A:
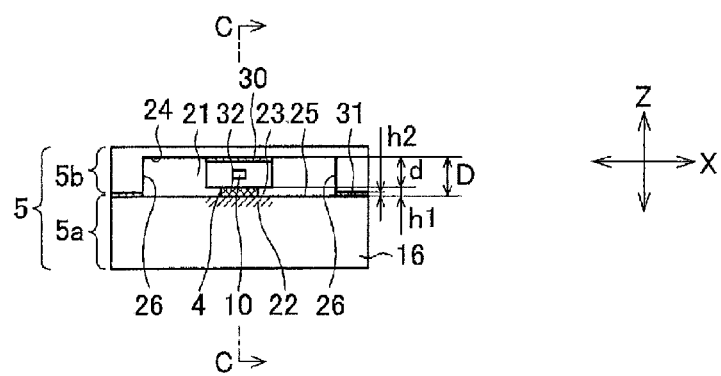
FIG. 17(a) is a longitudinal cross-sectional view (view taken along line A-A of FIG. 17(b)) showing a schematic configuration of the light guide module when the light guide module, in which the light guide is mounted in a package serving as a seventh variant, is seen from the light receiving portion side.
Figure 17B:
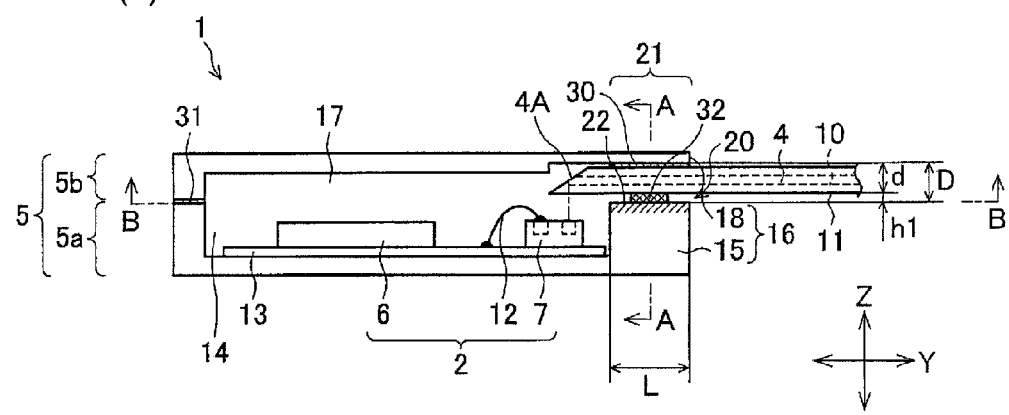
FIG. 17(b) is a transverse cross-sectional view (view taken along line C-C of FIG. 17(a)) showing a schematic configuration of the light guide module when the light guide module, in which the light guide is mounted in a package serving as the seventh variant, is seen from the light receiving portion side.
Figure 17C:
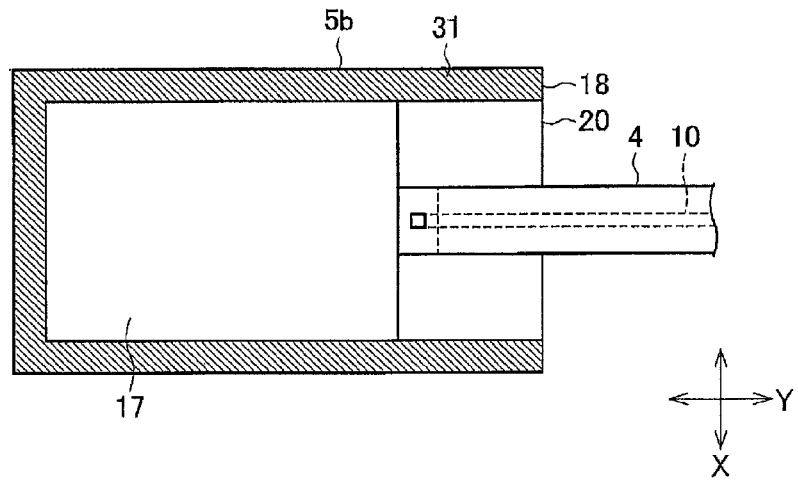
FIG. 17(c) is a top view (view taken along line B-B of FIG. 17(b)) showing a schematic configuration of the light guide module when the light guide module, in which the light guide is mounted in a package serving as the seventh variant, is seen from the light receiving portion side.

The package 5 according to the present embodiment has a configuration in which the light guide 4 is mounted on the upper surface of the supporting portion 5a, but the present invention is not limited thereto, and the light guide 4 may be mounted on the lower surface of the lid 5b, that is, the upper surface of the recess 17 forming the through-hole 21, as shown in FIGS. 17(a) to 17(c). In this case, the gap 23 forms between the through-hole lower surface 25 and the lower surface of the light guide 4 in the through-hole 21, and the gap 23 is filled with the adhesive 32. The length of the through-hole side surface 26 in the Z-axis direction, that is, the length D from the through-hole lower surface 25 to the through-hole upper surface 24 is set to be greater than the length d from the through-hole upper surface 24 to the lower surface of the light guide 4, and the thickness h1 in the Z-axis direction of the adhesive 32 is set to be greater than the thickness h2 in the Z-axis direction of the adhesive 31.

(Eighth Variant)

Figure 18A:
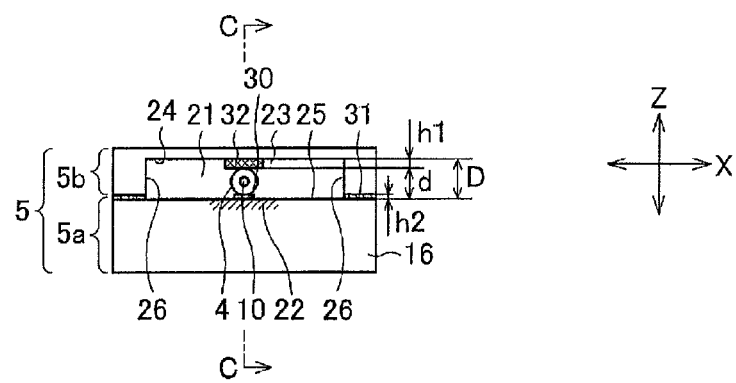
FIG. 18(a) is a longitudinal cross-sectional view (view taken along line A-A of FIG. 18(b)) showing a schematic configuration of the light guide module when the light guide module, in which the light guide serving as an eighth variant is mounted in a package, is seen from the light receiving portion side.
Figure 18B:
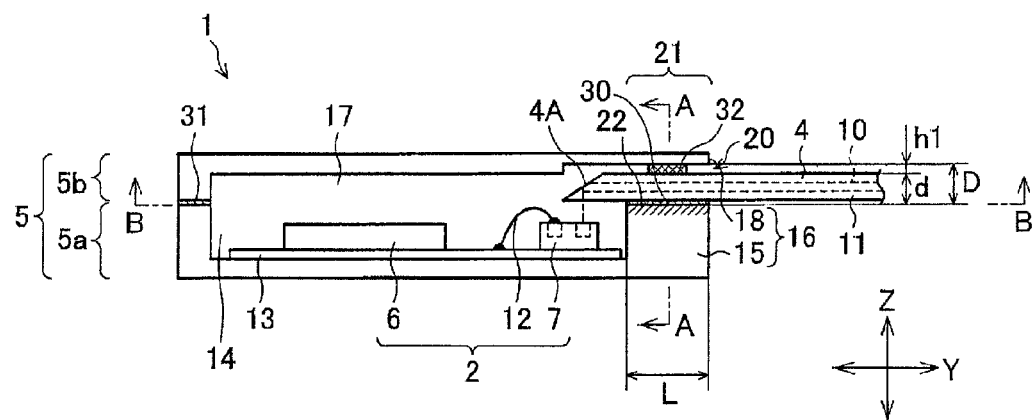
FIG. 18(b) is a transverse cross-sectional view (view taken along line C-C of FIG. 18(a)) showing a schematic configuration of the light guide module when the light guide module, in which the light guide serving as the eighth variant is mounted in a package, is seen from the light receiving portion side.
Figure 18C:
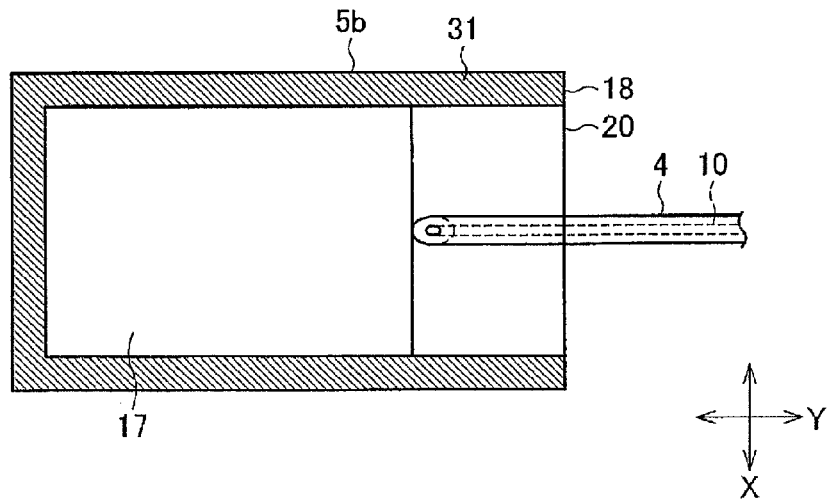
FIG. 18(c) is a top view (view taken along line B-B of FIG. 18(b)) showing a schematic configuration of the light guide module when the light guide module, in which the light guide serving as the eighth variant is mounted in a package, is seen from the light receiving portion side.

The package 5 of the present embodiment uses the light guide 4 of flexible film-shape, but the present invention is not limited thereto, and an optical fiber having a circular cross-section may be used in place of the light guide 4, as shown in FIGS. 18(a) to 18(c).

(Ninth Variant)

Figure 19A:
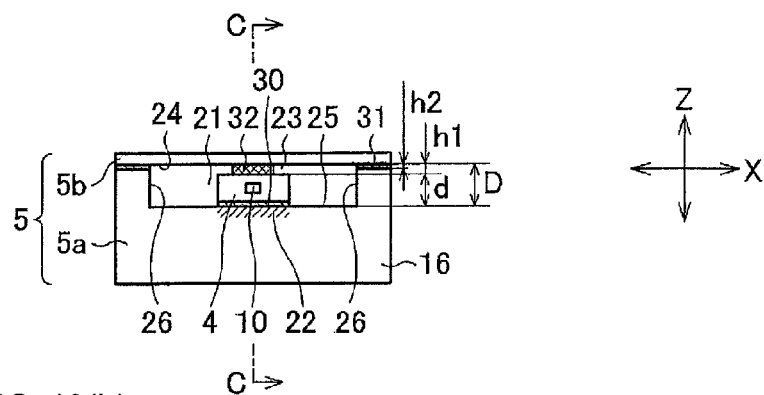
FIG. 19(a) is a longitudinal cross-sectional view (view taken along line A-A of FIG. 19(b)) showing a schematic configuration of the light guide module when the light guide module, in which the light guide is mounted in a package serving as a ninth variant, is seen from the light receiving portion side.
Figure 19B:
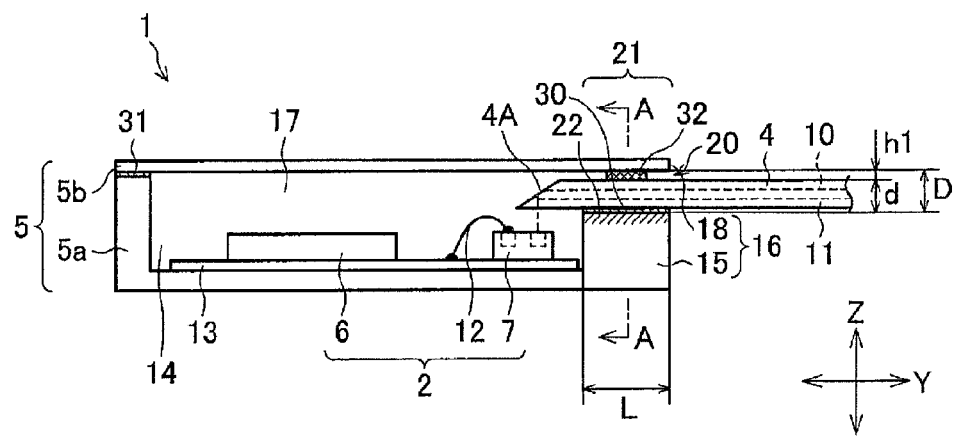
FIG. 19(b) is a transverse cross-sectional view (view taken along line C-C of FIG. 19(a)) showing a schematic configuration of the light guide module when the light guide module, in which the light guide is mounted in a package serving as the ninth variant, is seen from the light receiving portion side.

The package 5 of the present embodiment has a configuration in which the recess 17 is formed by four side walls extending downward from the upper plate of the lid 5b at the lower surface of the lid 5b, but the present invention is not limited thereto, and the lid 5b may have a plate shape without being formed with the recess 17, as shown in FIGS. 19(a) and 19(b). In this case, the through-hole 21 is configured by the lower surface of the lid 5b, the upper surface of the side wall 15, and the two side walls raised so as to sandwich the side wall 15 in the X-axis direction at the supporting portion 5a. In this case, the adhesive 32 is applied to the upper surface of the light guide 4 in advance, and then the lid 5b is placed over the supporting portion 5a. The thickness h1 in the Z-axis direction of the adhesive 32 is set to be greater than the thickness h2 in the Z-axis direction of the adhesive 31.

(Tenth Variant)

Figure 20A:
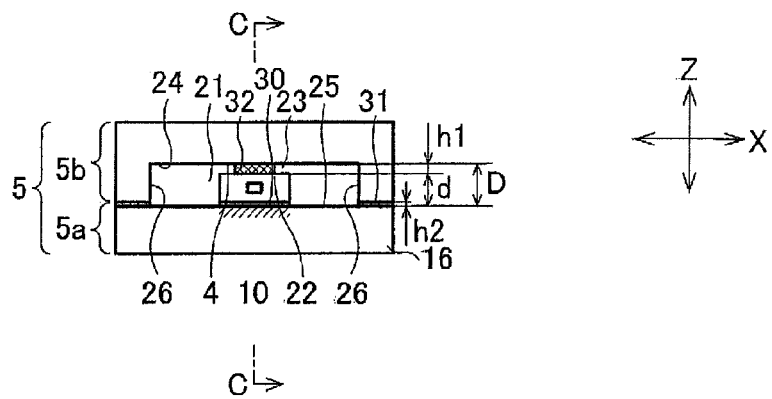
FIG. 20(a) is a longitudinal cross-sectional view (view taken along line A-A of FIG. 20(b)) showing a schematic configuration of the light guide module when the light guide module, in which the light guide is mounted in a package serving as a tenth variant, is seen from the light receiving portion side.
Figure 20B:
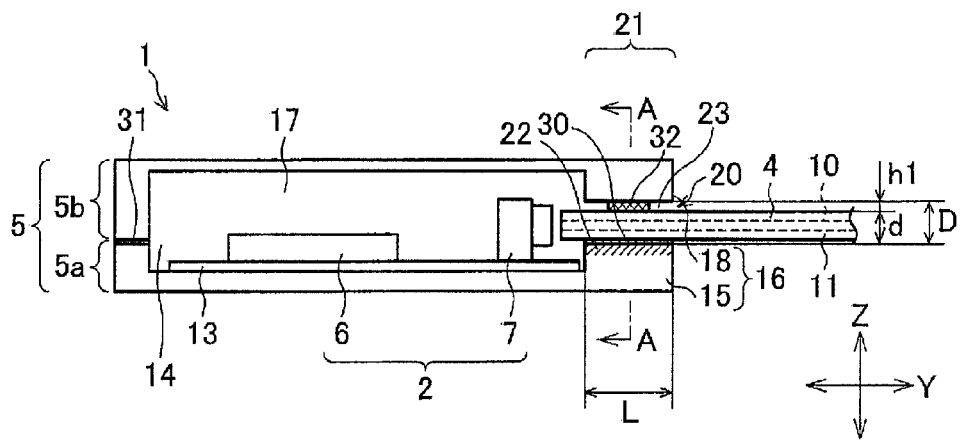
FIG. 20(b) is a transverse cross-sectional view (view taken along line C-C of FIG. 20(a)) showing a schematic configuration of the light guide module when the light guide module, in which the light guide is mounted in a package serving as the tenth variant, is seen from the light receiving portion side.

In the present embodiment, a case in which the light emitting portion 7 is arranged to emit light in the normal direction of the lead frame substrate surface 13 between the light guide 4 and the lead frame substrate surface 13 in the package 5 has been described, but the present invention is not limited thereto. For example, the light emitting portion 7 may be installed to emit light parallel to the lead frame substrate surface 13, as shown in FIGS. 20(a) and 20(b).

According to the above configuration, the light incident surface 4A and the light exit surface 4B can be adapted even with respect to the light guide 4 arranged perpendicular to the light transmission direction in a case where the light is transmitted through the core 10.

The light emitting portion 7 in which the size in the direction parallel to the lead frame substrate surface 13 is smaller than the size in the normal direction of the lead frame substrate surface 13 can be compactly mounted.

(Eleventh Variant)

Figure 21A:
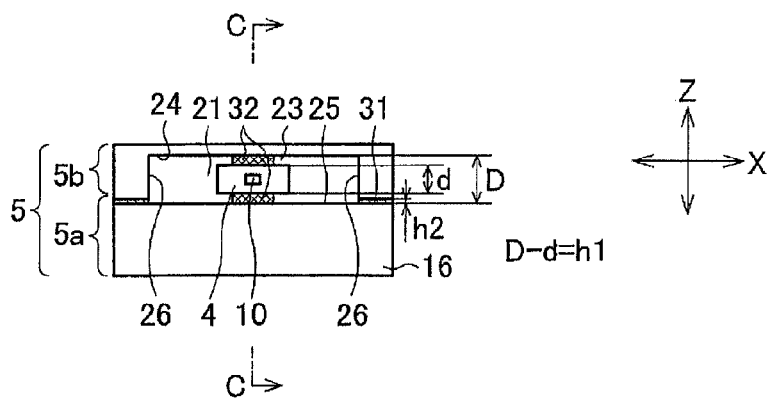
FIG. 21(a) is a longitudinal cross-sectional view (view taken along line A-A of FIG. 21(b)) showing a schematic configuration of the light guide module when the light guide module, in which the light guide is mounted in a package serving as an eleventh variant, is seen from the light receiving portion side.
Figure 21B:
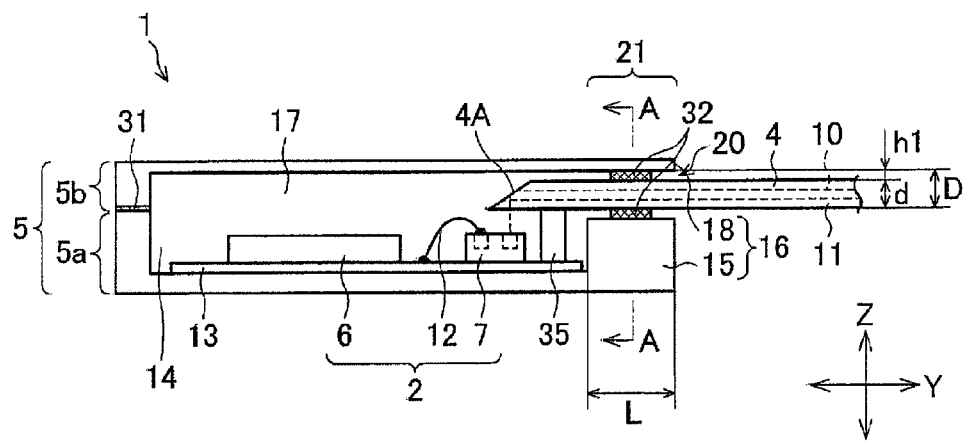
FIG. 21(b) is a transverse cross-sectional view (view taken along line C-C of FIG. 21(a)) showing a schematic configuration of the light guide module when the light guide module, in which the light guide is mounted in a package serving as the eleventh variant, is seen from the light receiving portion side.
Figure 22:
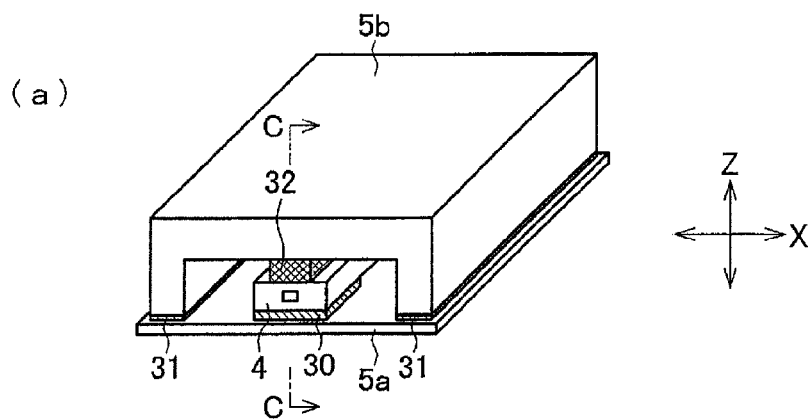
FIGS. 22(a) and 22(b) are a perspective view showing the light guide module, in which the light guide is mounted on the package serving as a twelfth variant, and a transverse cross-sectional view (view taken along line C-C) showing a schematic configuration of the light guide module, respectively.
Figure 22:
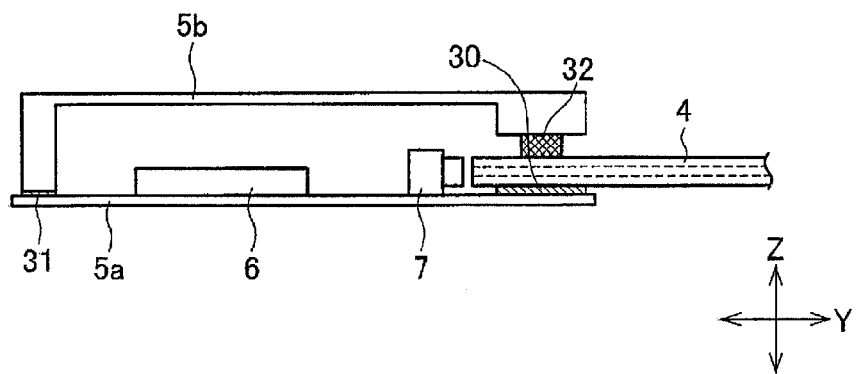
Figure 23:
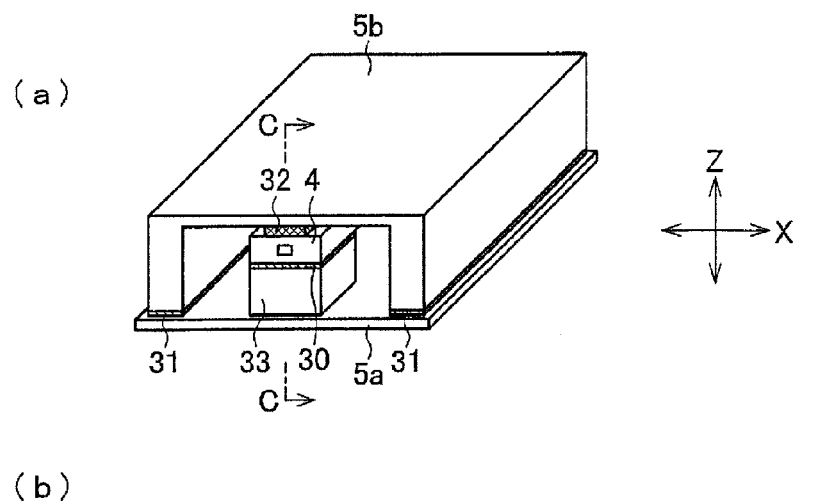
FIGS. 23(a) and 23(b) are a perspective view showing another light guide module, in which the light guide is mounted on the package serving as the twelfth variant, and a transverse cross-sectional view (view taken along line C-C) showing a schematic configuration of the light guide module, respectively.

The package 5 of the present embodiment is not limited to the configuration in which the light guide 4 is mounted on the upper surface of the supporting portion 5a, or the configuration in which the light guide 4 is mounted on the lower surface of the lid 5b as in the sixth variant. For example, as shown in FIGS. 21(a) and 21(b), the light guide 4 may be supported by a support member (supporting portion) 35 arranged in the recess 14 of the supporting portion 5a, and not supported by the supporting portion 5a and the lid 5b. In this case, the adhesive 32 is filled to the gap formed between the through-hole upper surface 24 and the upper surface of the light guide 4 and the gap formed between the lower surface of the light guide 4 and the through-hole lower surface 25 in the through-hole 21. In this case, h1 (corresponding to D-d), which is the sum of the length in the Z-axis direction of the adhesive 32 for adhering the through-hole upper surface 24 and the upper surface of the light guide 4 and the length in the Z-axis direction of the adhesive 32 for adhering the lower surface of the light guide 4 and the through-hole lower surface 25, is greater than the length h2 in the Z-axis direction of the adhesive 31.

(Twelfth Variant)

The package 5 according to the present embodiment has a configuration of including the supporting portion 5a with the recess 14 and the lid 5b for covering the supporting portion 5a, but the present invention is not limited thereto, and the supporting portion 5a may be configured by a planar flat plate-shaped member such as a substrate, as shown in FIG. 22(a). Specifically, the package 5 may be configured by the planar flat plate-shaped supporting portion 5a, and the lid 5b to be adhered to the supporting portion 5a by the adhesive 31 so as to cover the light guide 4 adhered to the supporting portion 5a by the adhesive 30.

Furthermore, in the twelfth variant, the end on the incident side of the light guide 4 is cut perpendicular to the core since a light emitting element of a side surface light emitting type as shown in the tenth variant is used for the light emitting portion 7. However, as shown in FIG. 23(b), if the light guide 4 has a configuration in which the end on the incident side of the light guide 4 is cut at an angle of 45° with respect to the core, a height compensation member 33 for adjusting the distance may be used between the light guide 4 and the supporting portion 5a to maintain the distance between the light emitting portion 7 and the end on the incident side of the light guide 4 constant. A state where such a height compensation member 33 is installed is shown in FIG. 23(a). In this case, the adhesive 30 is filled between the upper surface of the height compensation member 33 and the lower surface of the light guide 4 when the light emitting direction from the light emitting portion 7 is the upward direction.

(Thirteenth Variant)

In the present embodiment, the length h1 in the Z-axis direction of the adhesive 32 filled between the light guide 4 and the lid 5b or the length h2 in the Z-axis direction of the adhesive 30 filled between the light guide 4 and the supporting portion 5a in the through-hole 21 formed at the side wall 18 is longer than the length h3 in the Z-axis direction of the lid adhesive 31, and the adhesive 30 or the adhesive 32 is made of a material softer than the light guide 4.

Figure 24:
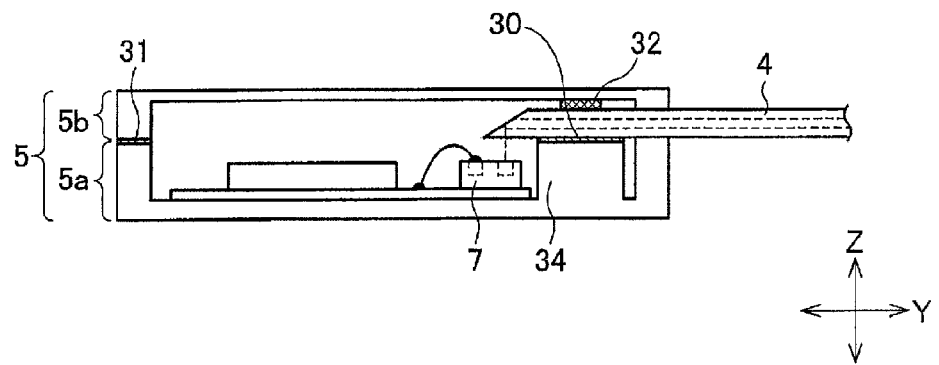
FIG. 24 is a transverse cross-sectional view showing a schematic configuration of the light guide module in which the light guide is mounted on the package serving as a thirteenth variant.

However, the present invention is not limited to the configuration in the through-hole 21, and a projection (supporting portion) 34 may be formed at the supporting portion 5a, the light guide 4 may transverse a space between the projection 34 and the lid 5b, the space between the light guide 4 and the lid 5b may be filled with the adhesive 32, and the space between the light guide 4 and the projection 34 may be filled with the adhesive 30, as shown in FIG. 24.

Figure 25:
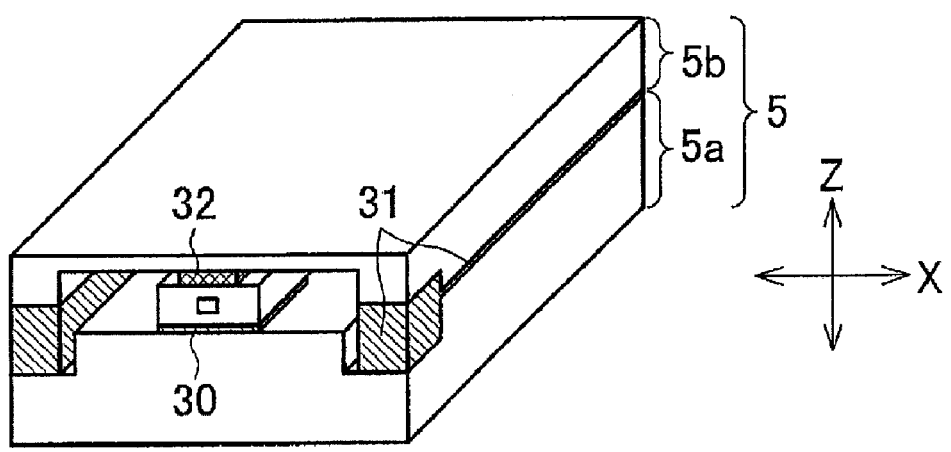
FIG. 25 is a perspective view showing an example of another light guide module in which the light guide is mounted on the package serving as the thirteenth variant.

The present invention is not limited to the above configuration, and the length in the Z-axis direction of the adhesive 32 filled between the light guide 4 and the lid 5b passing through the through-hole 21 or the adhesive 30 filled between the light guide 4 and the supporting portion 5a may be longer than the length in the Z-axis direction of the adhesive 31 for adhering the lid 5b and the supporting portion 5a at the portion other than the through-hole 21, as shown in FIG. 25. In other words, the length in the Z-axis direction of at least either the adhesive 32 or the adhesive 30 or the length, in which the length in the Z-axis direction of the adhesive 32 and the length in the Z-axis direction of the adhesive 30 are added, may be longer than the length in the Z-axis direction of the adhesive 31 filled to a portion where the distance between the supporting portion 5a and the lid 5b becomes a minimum.

APPLICATION EXAMPLE

The light guide module 1 including the light guide 4 and the package 5 for mounting the light guide 4 of the present embodiment can be applied to the following application examples.

First, as a first application example, use can be made at a hinge portion in a foldable electronic device such as a foldable portable telephone, a foldable PHS (Personal Handyphone System), a foldable PDA (Personal Digital Assistant), and a foldable notebook computer.

Figure 26:
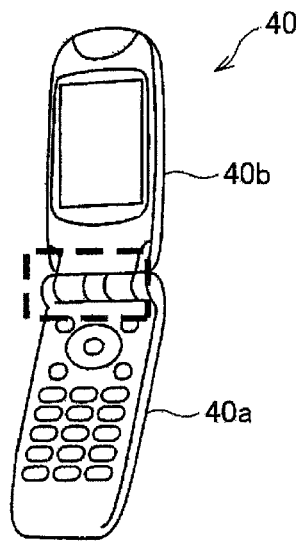
FIGS. 26(a) to 26(c) are a perspective view showing an outer appearance of a foldable portable telephone including the light guide module, a block diagram of a portion where the light guide module is applied in the foldable portable telephone, and a perspective plan view of a hinge portion (portion surrounded with broken line) of the foldable portable telephone, respectively.
Figure 26:
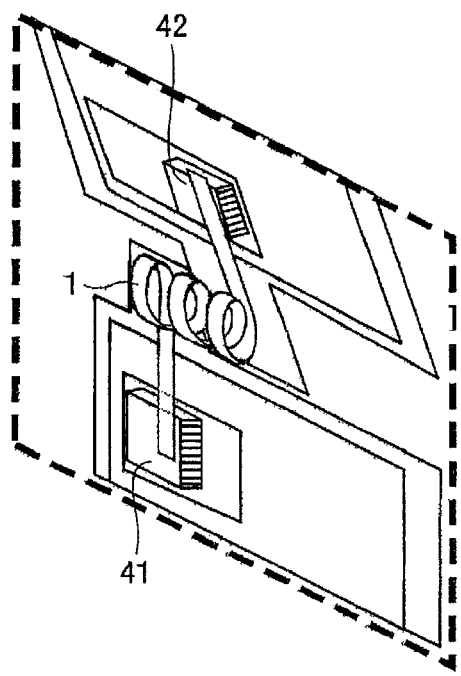
Figure 26:
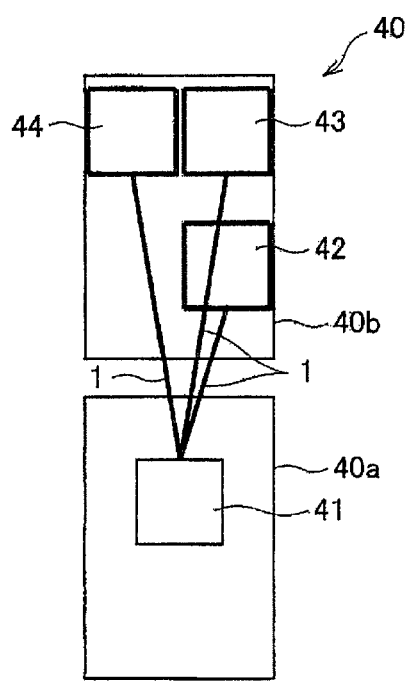

FIGS. 26(a) to 26(c) show an example in which the light guide module 1 is applied to a foldable portable telephone 40. In other words, FIG. 26(a) is a perspective view showing an outer appearance of the foldable portable telephone 40 incorporating the light guide module 1.

FIG. 26(b) is a block diagram of a portion where the light guide module 1 is applied in the foldable portable telephone 40 shown in FIG. 26(a). As shown in the figure, a control unit 41 arranged on a body 40a side in the foldable portable telephone 40, an external memory 42, a camera (digital camera) 43, and a display unit (liquid crystal display) 44 arranged on a lid (drive portion) 40b side rotatably arranged at one end of the body with the hinge portion as a shaft are connected by the light guide module 1.

FIG. 26(c) is a perspective plan view of the hinge portion (portion surrounded with a broken line) in FIG. 26(a). As shown in the figure, the light guide module 1 is wrapped around a supporting rod at the hinge portion and bent to thereby connect the control unit arranged on the body side, and the external memory 42, the camera 43, and the display unit 44 arranged on the lid side.

High speed and large capacity communication can be realized in a limited space by applying the light guide module 1 to the foldable electronic device. Therefore, it is particularly suitable for devices where high speed and large capacity data communication is necessary and miniaturization is demanded such as the foldable liquid crystal display.

As a second application example, the light module 1 is applied to a device having a drive portion such as a printer head in a printing device (electronic device) and a reading unit in a hard disk recording and reproducing device.

Figure 27:
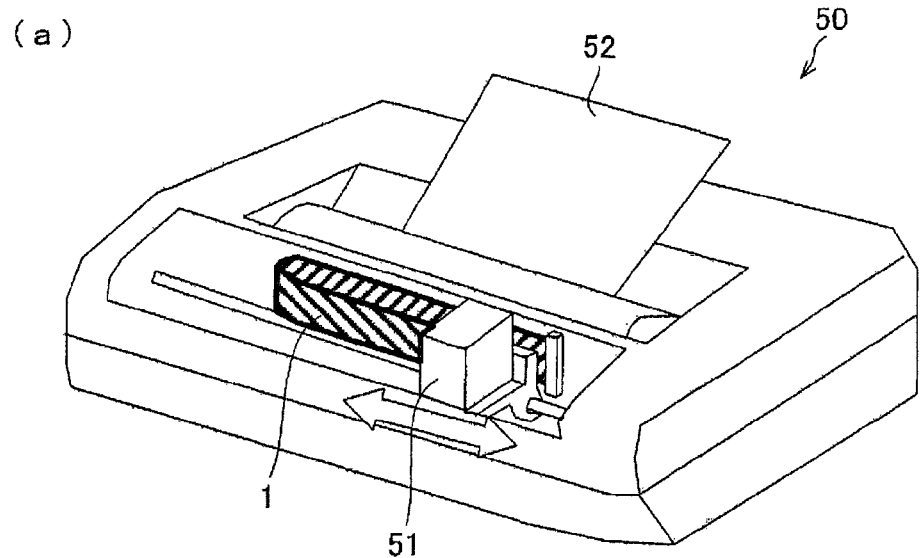
FIGS. 27(a) to 27(d) are a perspective view showing an outer appearance of a printing device, a block diagram showing a portion applied with the light guide module in the printing device, and perspective views showing a curved state of the light guide module when a printer head is moved (driven) in the printing device, respectively.
Figure 27:
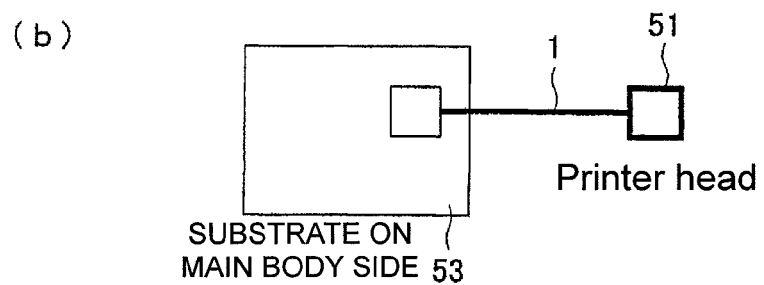
Figure 27:
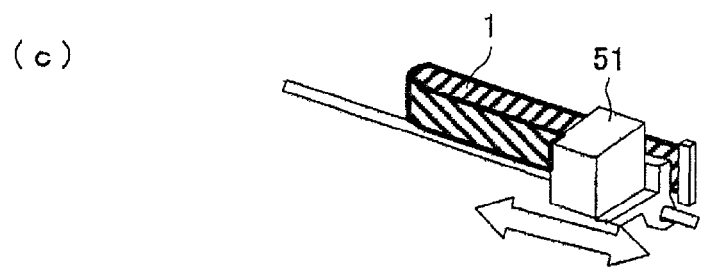
Figure 27:
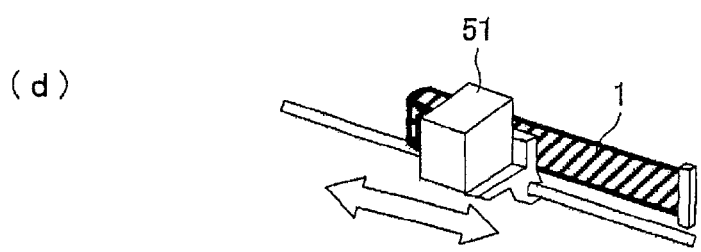

FIGS. 27(a) to 27(d) show an example in which the light guide module 1 is applied to a printing device 50. FIG. 27(a) is a perspective view showing an outer appearance of the printing device 50. As shown in the figure, the printing device 50 includes a printer head 51 for performing printing on a paper 52 while moving in a width direction of a paper 52, where one end of the light guide module 1 is connected to the printer head 51.

FIG. 27(b) is a block diagram of a portion where the light guide module 1 is applied in the printing device 50. As shown in the figure, one end of the light guide module 1 is connected to the printer head 51, and the other end is connected to a substrate on the main body side in the printing device 50. The substrate on the main body side includes a control means for controlling the operation of each unit of the printing device 50, and the like.

FIGS. 27(c) and 27(d) are perspective views showing a curved state of the light guide module 1 when the printer head 51 is moved (driven) in the printing device 50. As shown in the figures, when the light guide module 1 is applied to the drive portion such as the printer head 51, the curved state of the light guide module 1 changes by the drive of the printer head 51 and each position of the light guide module 1 repeatedly curves.

Therefore, the light guide module 1 according to the present embodiment is suitable for such drive portions. Furthermore, high speed and large capacity communication using the drive portion can be realized by applying the light guide module 1 to such drive portions.

Figure 28:
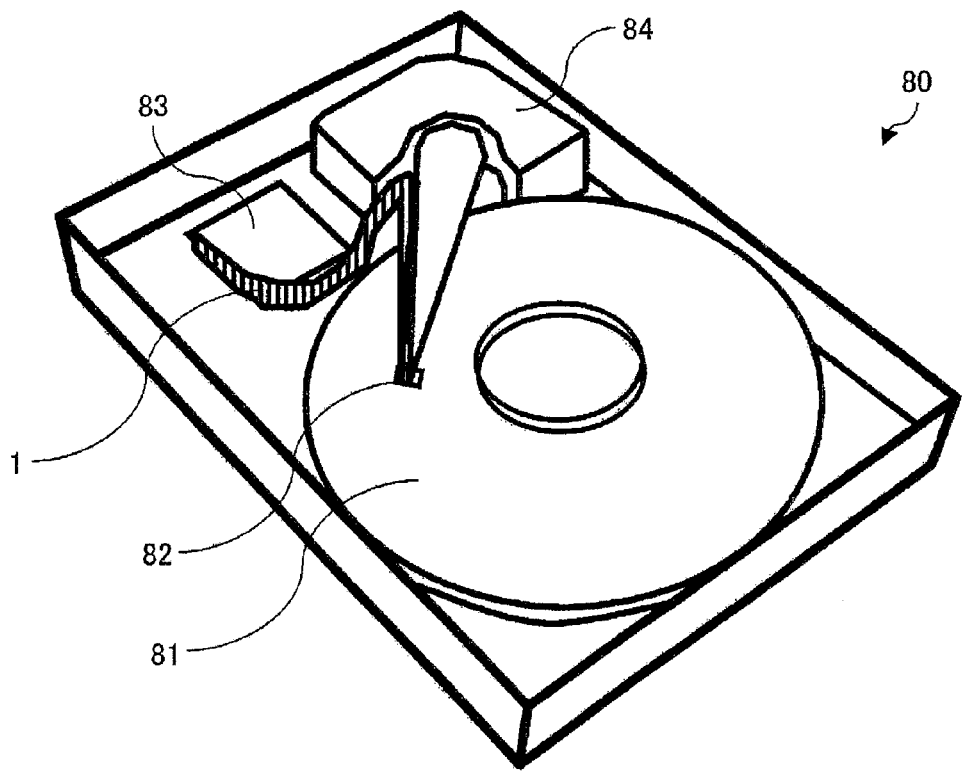
FIG. 28 shows an example in which the light guide module is applied to a hard disk recording and reproducing device.
Figure 29:
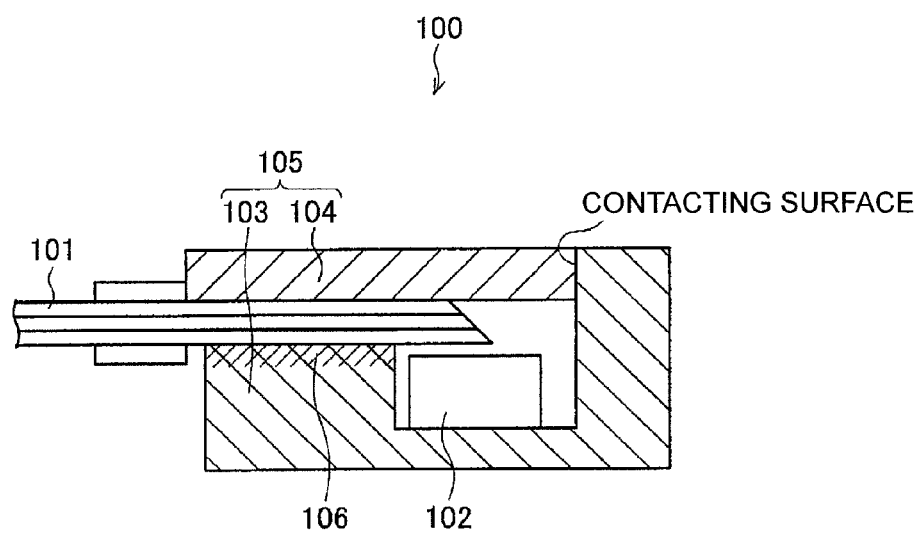
FIG. 29 is a perspective view showing a schematic configuration of a package of a conventional optical module.

FIG. 28 shows an example in which the light guide module 1 is applied to a hard disk recording and reproducing device 60.

As shown in the figure, the hard disk recording and reproducing device 60 includes a disk (hard disk) 61, a head (read/write head) 62, a substrate introducing portion 63, a drive portion (drive motor) 64, and the light guide module 1.

The drive portion 64 drives the head 62 along a radial direction of the disk 61. The head 62 reads the information recorded on the disk 61 and writes information on the disk 61. The head 62 is connected to the substrate introducing portion 63 by way of the light guide module 1, and propagates the information read from the disk 61 to the substrate introducing portion 63 as an optical signal and receives the optical signal of the information to write to the disk 61 propagated from the substrate introducing portion 63.

Therefore, high speed and large capacity communication can be realized by applying the light guide module 1 to the drive portion such as the head 62 in the hard disk recording and reproducing device 60.

The present invention is not limited to the above embodiments, and various modifications may be made within the scope of the Claims. In other words, the embodiments obtained by combining the technical means appropriately modified within the scope of the Claims are encompassed in the technical scope of the present invention.

INDUSTRIAL APPLICABILITY

The film light guide package and the film light guide module according to the present invention is applicable to the light communication path between various types of devices, and is also applicable to a flexible optical wiring serving as an in-device wiring mounted in a small and thin commercial-off-the-shelf device.

The invention claimed is:

1. A film light guide package formed by a supporting portion for supporting an optical element for emitting or receiving an optical signal, and a lid for covering the supporting portion; wherein
   the supporting portion includes a supporting surface for supporting at least one end of a film light guide including an incident/exit port of the optical signal in the film light guide for optically coupling with the optical element and transmitting the optical signal; and
   wherein a first direction is a perpendicular direction with respect to the supporting surface of the supporting portion,
   a length in the first direction from the supporting surface of the supporting portion to the lid is longer than a length in the first direction in a region of the film light guide supported by the supporting surface of the supporting portion, or
   wherein the lid includes a supporting surface for supporting at least one end of the film light guide including an incident/exit port of the optical signal in the film light guide for optically coupling with the optical element and transmitting the optical signal; and
   wherein the first direction is a perpendicular direction with respect to the supporting surface of the lid,
   a length in the first direction from the supporting surface of the lid to the supporting portion facing the supporting surface of the lid is longer than the length in the first direction in the region of the film light guide supported by the supporting surface of the lid,
   wherein an adhesive having higher flexibility than the film light guide is filled in a region of at least one part of a spatial region formed between the film light guide and the supporting portion or between the film light guide and the lid.

2. The film light guide package according to claim 1, wherein
   the supporting portion and the lid are fixed by a lid adhesive, and the film light guide and the film light guide package are fixed by at least one of a first adhesive arranged between the lid and the film light guide or a second adhesive arranged between the film light guide and the supporting portion in the first direction; and
   at least one of either the first adhesive or the second adhesive has the length in the first direction longer than the length in the first direction of the lid adhesive and has higher flexibility than the film light guide.

3. The film light guide package according to claim 2, wherein the length in the first direction of at least one of either the first adhesive or the second adhesive is greater than or equal to 5 μm.

4. The film light guide package according to claim 2, wherein
   at least one side wall of the film light guide package formed by the supporting portion and the lid includes at least one through-hole for accommodating the end of the film light guide at an interior of the film light guide package; and
   all regions other than the region where the film light guide passes through in the through-hole are filled with at least one of either the first adhesive or the second adhesive.

5. The film light guide package according to claim 2, wherein a Young's modulus of at least one of either the first adhesive or the second adhesive is smaller than a Young's modulus of the film light guide.

6. The film light guide package according to claim 2, wherein at least one of either the first adhesive or the second adhesive is made of resin material.

7. A film light guide module comprising:
   an optical element for emitting or receiving an optical signal;
   a film light guide, including a core made of a material having translucency and a clad made of a material having an index of refraction different from an index of refraction of the core, for optically coupling with the optical element and transmitting the optical signal; and
   a film light guide package formed by a supporting portion for supporting the optical element for emitting or receiving the optical signal and a lid for covering the supporting portion, wherein
   at least one end including an incident/exit port of the optical signal in the film light guide,
   the supporting portion includes a supporting surface for supporting at least one end of the film light guide including an incident/exit port of the optical signal in the film light guide for optically coupling with the optical element and transmitting the optical signal, and
   wherein a first direction is a perpendicular direction with respect to the supporting surface of the supporting portion, a length in the first direction from the supporting surface of the supporting portion to the lid is longer than a length in the first direction in a region of the film light guide supported by the supporting surface of the supporting portion, or wherein the lid includes a supporting surface for supporting at least on end of the film light guide including an incident/exit port of the optical signal in the film light guide for optically coupling with the optical element and transmitting the optical signal; and wherein the first direction is a perpendicular direction with respect to the supporting surface of the lid, a length in the first direction from the supporting surface of the lid to the supporting portion facing the supporting surface of the lid is longer than the length in the first direction in the region of the film light guide supported by the supporting surface of the lid, wherein an adhesive having higher flexibility than the film light guide is filled in a region of at least one part of a spatial region formed between the film light guide and the supporting portion or between the film light guide and the lid.

8. The film light guide module of claim 7, wherein the supporting portion and the lid are fixed by a lid adhesive, and the film light guide and the film light guide package are fixed by at least one of a first adhesive arranged between the lid and the film light guide or a second adhesive arranged between the film light guide and the supporting portion in the first direction; and at least one of either the first adhesive or the second adhesive has the length in the first direction longer than the length in the first direction of the lid adhesive and has higher flexibility than the film light guide.

9. The film light guide module of claim 8, wherein the length in the first direction of at least one of either the first adhesive or the second adhesive is greater than or equal to 5 μm.

10. The film light guide module of claim 9, wherein at least one side wall of the film light guide package formed by the supporting portion and the lid includes at least one through-hole for accommodating the end of the film light guide at an interior of the film light guide package; and all regions other than the region where the film light guide passes through in the through-hole are filled with at least one of either the first adhesive or the second adhesive.

11. The film light guide module of claim 8, wherein at least one side wall of the film light guide package formed by the supporting portion and the lid includes at least one through-hole for accommodating the end of the film light guide at an interior of the film light guide package; and all regions other than the region where the film light guide passes through in the through-hole are filled with at least one of either the first adhesive or the second adhesive.

12. The film light guide module of claim 8, wherein a Young's modulus of at least one of either the first adhesive or the second adhesive is smaller than a Young's modulus of the film light guide.

13. The film light guide module of claim 8, wherein at least one of either the first adhesive or the second adhesive is made of resin material.

14. An electronic device comprising a film light guide module of claim 7.

* * * * *